United States Patent [19]
Wians et al.

[11] Patent Number: 6,155,033
[45] Date of Patent: Dec. 5, 2000

[54] SELF-PROPELLED POWER TOOL CONTROL DEVICE

[75] Inventors: Jeff A. Wians, Mebane, N.C.; Daniel J. Turk, Columbus, Ohio

[73] Assignee: Honda Giken Kogyo Kabushiki Kaisha, Tokyo, Japan

[21] Appl. No.: 09/106,836

[22] Filed: Jun. 30, 1998

[51] Int. Cl.⁷ .......................... A01D 69/10; A01D 34/03
[52] U.S. Cl. ........................ 56/11.1; 56/11.3; 56/11.8; 56/16.9
[58] Field of Search ................... 56/11.1, 11.4, 56/11.6, 11.8, 16.9, DIG. 19, DIG. 22, 11.3, 11.5, 11.7

[56] References Cited

U.S. PATENT DOCUMENTS

| | | | |
|---|---|---|---|
| 4,037,668 | 7/1977 | Svejda | 172/371 |
| 4,285,419 | 8/1981 | Anderson | 192/11 |
| 4,300,332 | 11/1981 | Jackson | 56/11.3 |
| 4,409,779 | 10/1983 | Bent et al. | 56/11.3 |
| 4,454,706 | 6/1984 | Geeck, III | 56/11.3 |
| 4,493,180 | 1/1985 | Wick | 56/11.3 |
| 4,518,047 | 5/1985 | Peterson et al. | 172/611 |
| 4,551,967 | 11/1985 | Murcko | 56/13.7 |
| 4,558,558 | 12/1985 | Horner, Jr. et al. | 56/11.3 |
| 4,813,215 | 3/1989 | Chase et al. | 56/11.6 |
| 4,878,339 | 11/1989 | Marier et al. | 56/14.7 |
| 5,014,791 | 5/1991 | Kure | 172/21 |
| 5,020,308 | 6/1991 | Braun et al. | 56/11.3 |
| 5,042,238 | 8/1991 | White, III et al. | 56/11.8 |
| 5,050,371 | 9/1991 | Tharman et al. | 56/10.5 |
| 5,127,215 | 7/1992 | Wenzel | 56/11.1 |
| 5,138,824 | 8/1992 | Oshima et al. | 56/10.2 |
| 5,146,735 | 9/1992 | McDonner | 56/11.3 |
| 5,343,678 | 9/1994 | Stuart | 56/11.3 |
| 5,357,698 | 10/1994 | Phillips | 56/16.9 |
| 5,435,118 | 7/1995 | Cobile | 56/16.9 |
| 5,488,818 | 2/1996 | Powers et al. | 56/11.4 |
| 5,626,008 | 5/1997 | Puszkar | 56/16.9 |
| 5,661,962 | 9/1997 | Monaco | 56/16.9 |
| 5,680,903 | 10/1997 | Oliver | 172/22 |
| 5,692,366 | 12/1997 | Hardesty | 56/11.2 |

*Primary Examiner*—Eileen D. Lillis
*Assistant Examiner*—Raymond W Addie
*Attorney, Agent, or Firm*—Armstrong, Westerman, Hattori, McLeland & Naughton

[57] ABSTRACT

A large capacity, self-propelled walk-behind power tool, such as a lawn mower, employs gear-operated transmissions for independently driving each drive wheel. The transmission output shafts connect directly with the drive wheels, and clutch elements for use with the respective transmissions operably engage an input pulley to the transmission rather than an output pulley. The drive wheels are directly connected to the transmissions and the location of the clutching elements is within the periphery of the respective belts. The drive assembly is enclosed by the drive deck.

13 Claims, 16 Drawing Sheets

SELF-PROPELLED POWER TOOL CONTROL DEVICE

BACKGROUND OF THE INVENTION

1. Field of the Invention

The present invention relates to self-propelled, walk-behind power tools, such as lawn mowers, snow blowers or power sweepers, or like equipment. More particularly, the invention involves an effective, yet less expensive, drive system which is able to independently operate each drive wheel of the power deck of such tools in a manner to effect accurate and safe operation thereof.

2. Description of the Related Art

Although the present invention has utility in walk-behind snow blowers, power sweepers, or the like, the most common utilization of the invention is anticipated for lawn mowing equipment of the concerned type, and particularly, in large capacity, commercial walk-behind mowers. Consequently, except where otherwise expressly stated, the description herein is directed to walk-behind lawn mowing equipment, particularly large capacity lawn mowers.

Large capacity commercial-type self-propelled walk-behind lawn mowers commonly have a power deck containing two driven wheels and handle bars mounting the operating handles for the various mower control elements. The mower or tool deck, which connects with the power deck, carries idler or caster wheels to support and balance the mower deck.

Desirably, power input to the drive wheels is effected separately and independently to the respective drive wheels. This allows the machine to be effectively steered by varying the driving input and the braking of one wheel with respect to the other whereby the machine is able to turn about a tight radius.

Most commercial lawn mowers of the prior art employ drive wheels and mower blades which are belt-driven by a motor through transmission systems that utilize output-varying devices for regulating the operation of the various tools and wheel drives. The transmission systems may be hydrostatic transmissions which comprise at least one pump connected to the engine output, typically by a belt and pulley system. The pump or pumps are operable to drive hydraulic motors that are drivingly connected to the respective mower drive wheels and that are independently controlled by means of operating controls mounted on the mower handle bars. Hydrostatic transmissions, although relatively high in cost, have the advantage that the speed and direction of each wheel can be infinitely varied between a lower limit and an upper limit with fewer moving parts than are contained in a conventional gear-operated transmission.

Hydrostatic transmissions have the further advantage that the drive wheels of the power deck can be directly coupled to the hydraulic motor connected to the hydrostatic transmission and, as with hydrostatic transmissions arranged in a lawn mower as shown and described in U.S. Pat. No. 5,127,215 to P. H. Wenzel, the transmission input shaft and the engine drive shaft can rotate about parallel axes whereby the amount of space occupied by the drive train is reduced to an extent that all of the operating parts can be conveniently enclosed by a deck bed which forms a protective covering over the drive train components for safety purposes and to protect the components from damage.

The other, less expensive, form of transmission employed with commercial lawn mowers is a multi-speed geared transmission which obtains input from an engine via a belt and pulley system and outputs, through appropriate gearing, a plurality of discrete speeds to the drive wheels of the power deck. In this form of transmission system, the output from the transmission is typically transmitted to each drive wheel by separate belt and pulley systems. Torque transmitted to the respective wheels is, as shown for example, in U.S. Pat. No. 4,558,558 to H. F. Horner Jr. et al. and U.S. Pat. No. 5,343,678 to T. G. Stuart, controlled by a clutch device in the form of an idler pulley mounted on an arm that pivots into increasing or decreasing engagement with the wheel drive belt so as to vary the tension on the belt and thus the wrap angle about the respective driving and driven pulleys to selectively adjust the torque being transmitted therebetween.

Gear-operated transmissions for self-propelled, commercial-type lawn mowers suffer the disadvantage that idler pulley action to vary torque transmission is conducted under low speed and, accordingly, high torque conditions. Consequently, the drive belts must support this high torque while they are subjected to large tension loads. Thus, the belts are prone to slip relative to the wheel pulley when the drive is subjected to high load conditions. Drive belts of the concerned type are therefore prone to a high degree of wear necessitating frequent replacement.

It is to the amelioration of such problems in self-propelled, walk-behind power tools, such as lawn mowers, to which the present invention is directed.

SUMMARY OF THE INVENTION

The present invention provides a lawn mower drive system in which gear transmissions are employed in such manner as to produce many of the advantages heretofore obtained only from hydrostatic transmissions and without the cost attendant with the use of hydrostatic transmissions. The components of the instant lawn mower drive system are, first, so arranged that the idler pulley employed to alter the torque transmitted to the wheel is disposed to engage the belt which connects the engine to the transmission rather than the belt that connects the transmission to the wheel. Thus, the drive belt is subjected to higher speed but lower torque conditions unlike in conventional gear-driven mowers so as to reduce belt wear. Secondly, in order to contribute to equipment compactness, the drive wheels of the power deck are directly connected to the respective transmission output shafts, and the idler pulleys employed as transmission clutch devices are so arranged within the drive train as to enable a substantially total enclosure of the operating parts by the power deck of the machine.

Accordingly, the present invention provides a self-propelled, walk-behind power tool comprising a power deck mounting an engine having a rotatable drive shaft, a wheel drive assembly including left and right drive wheels mounted on opposite lateral spacing from beneath the power deck, a power train including a pair of gear-operated transmissions, each being drivingly connected to one of the drive wheels, and means for drivingly connecting the transmissions to the engine drive shaft, a tool deck containing a rotatably drivable tool connected to a front side of the power deck, handle-bar means attached to a rear side of the power deck and containing controls for independently operating each of the drive wheels and the rotatably mounted tool, and means for selectively attaching one of a plurality of rotatable tools to the tool deck.

Also the power train of the present invention preferably includes a self-propelled, walk-behind power tool in which the power train further includes a pair of idler pulleys, each being operative to engage one of the input belts, each idler pulley being rotatably mounted on one end of a lever which is pivotally mounted with respect to the power deck, and the control means includes means connected to each respective idler pulley lever and being operative to pivot each lever between angularly displaced positions to vary the wrap angles defined by the input belts on the respective drive and input pulleys.

Ideally, the levers which mount the respective idler pulleys are disposed within the periphery of the respective associated input belts and, further, are normally resiliently biased out of engagement with the associated input belt.

The present invention includes a self-propelled, walk-behind power tool in which the control means includes a pair of drive handles attached to the apparatus handle bars for independent pivotal movement and connecting rod means extending from each drive handle to a respective one of the idler pulley levers, wherein pivoted movement of each drive handle effects pivotal movement of the idler pulley lever with respect to the associated input belt.

A more specific form of the invention comprises a self-propelled, walk-behind lawn mower comprising a power deck including a bed, an engine mounted on an upper surface of the bed and having a rotatable drive shaft depending therethrough, a wheel drive assembly disposed beneath the bed and including left and right drive wheels, each being journalled for rotation on opposite sides of the bed, an axle having an axis extending substantially perpendicular to the drive shaft, and a power train connecting the engine to the drive wheels, a mower deck containing a blade assembly having at least one rotatable mower blade connected to a front side of the power deck, handle-bar means attached to a rear side of the power deck and containing controls for independently operating each of the drive wheels and the at least one mower blade, the power train including left and right transmissions each having an input shaft extending parallel to the engine drive shaft and an output shaft operatively aligned and connecting an associated drive wheel axle, a power take-off pulley mounted on the engine drive shaft and belt means operatively interconnecting the engine drive shaft and the mower blade, an input pulley on the input shaft of each of the left and right transmissions, and a pair of drive pulleys mounted on the engine drive shaft in spaced relation from the power take-off pulley, an input belt extending from each of the drive pulleys to one of the left and right transmissions, a pair of idler pulleys, each being operative to engage one of the input belts, each idler pulley being rotatably mounted on one end of a respective lever whose other end is pivotally attached to the bed, and left and right control means positioned on the handle bar and having means connected to each respective idler pulley lever and being operative to pivot each lever between positions to vary the tension of the input belts on the respective drive and input pulleys.

According to a preferred form of the invention, the controls employed for independently operating each of the drive wheels and the power take-off means includes a pivot support shaft fixed to the power deck, a pair of drive levers pivotally mounted on the support shaft, each having means for controllably transferring a driving force from the engine drive shaft to each of the transmissions, and linkage means interconnecting each the drive handle to one of the drive levers for selectively controlling the operation of each drive wheel.

In the aforementioned preferred forms of the invention the controls include a separate connecting link that may be provided with a lost motion coupling extending between and connecting each one of the drive levers to each respective idler pulley whereby each drive wheel is driven in respect to selective operation of the respective drive handles.

It is accordingly a particular object of the present invention to provide a lawn mower drive system which permits use of a less expensive gear-operated transmission for the drive wheels but is nonetheless able to manifest several advantageous features which heretofore have been unique to drive wheels that are driven by hydrostatic transmissions.

It is a further object of the present invention to provide a lawn mower belt drive system wherein a particular relationship is established between the elements of the system which permits power output from the motor to be operated via a clutching organization operating on high speed/low torque elements of the system whereby belt wear is materially reduced.

For a better understanding of the invention, its operating advantages and the specific objectives obtained by its use, reference should be made to the accompanying drawings and description which relate to a preferred embodiment thereof.

DETAILED DESCRIPTION OF THE INVENTION

Figure 1:
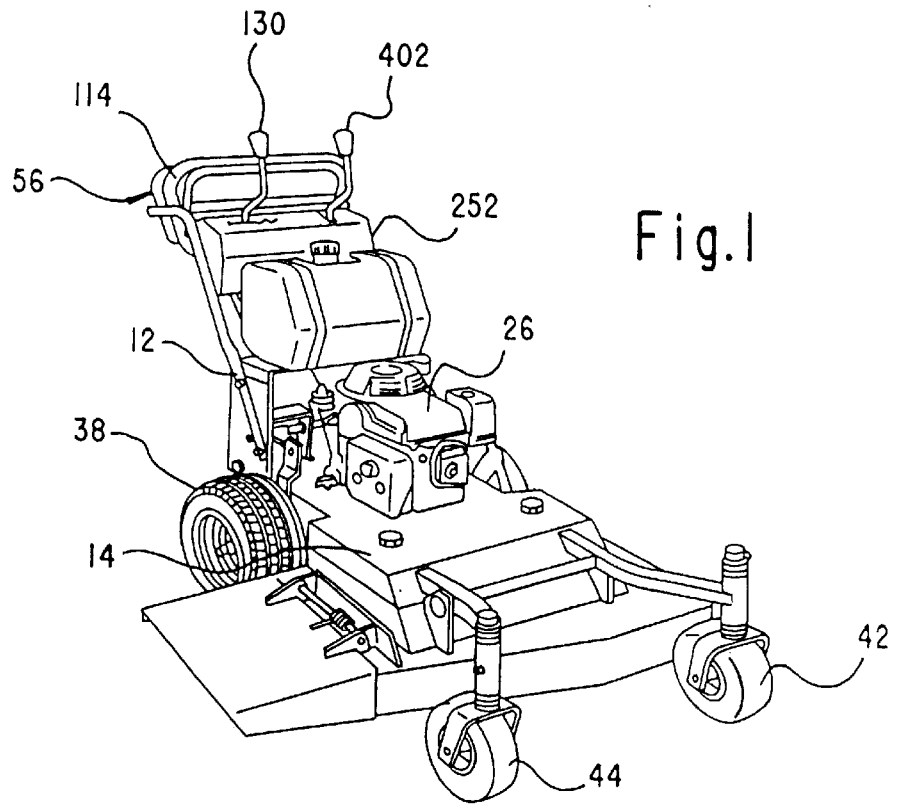
FIG. 1 is a front perspective view of a self-propelled, walk-behind form of lawn mower incorporating the present invention.

Although the present invention has application to power tools of various forms, such as snow blowers, power sweepers, or the like, the drawing figures illustrate an embodiment of the invention in which the operation element of the power tool is a lawn mower, particularly one employing multiple rotary blades as is common in large capacity, commercial forms of lawn mowing equipment. Also, although the disclosed lawn mower is described as being a "walk-behind" lawn mower, the concerned invention is equally applicable to power equipment attaching a "sulky" or a platform on which the operator may ride.

Figure 2:
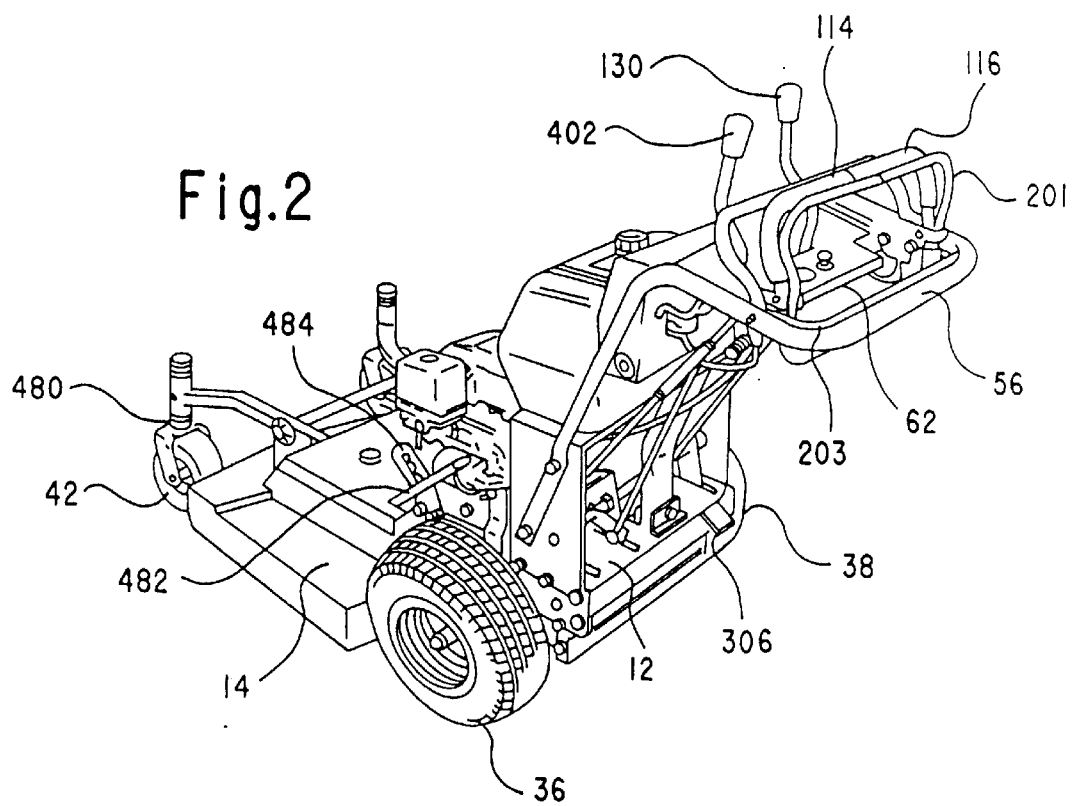
FIG. 2 is a rear perspective view of the lawn mower of FIG. 1.
Figure 3:
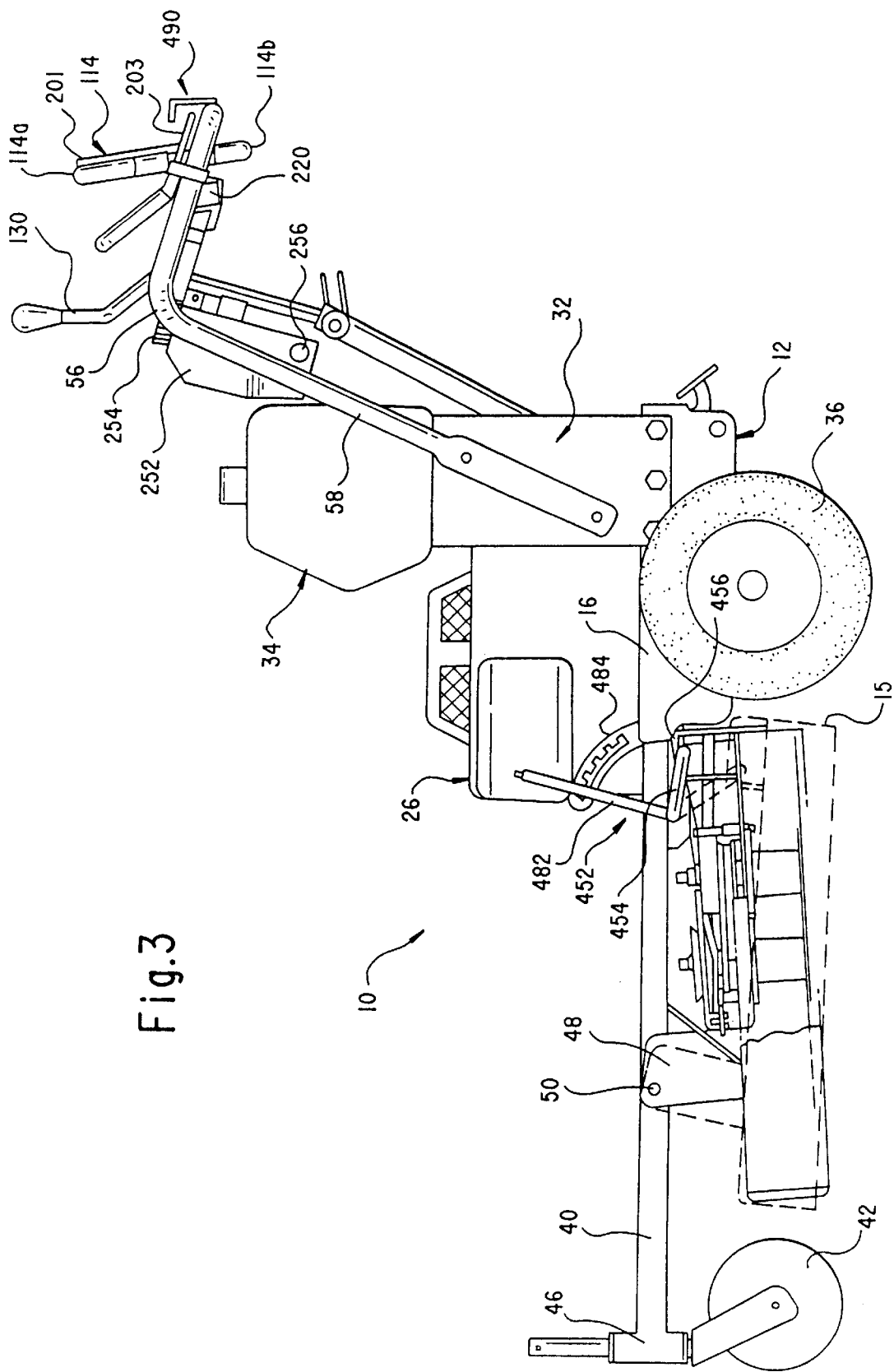
FIG. 3 is a side elevational view, partly in section, of the lawn mower illustrated in FIG. 1.

The described lawn mower 10, as best shown in FIGS. 1 to 3, contains a power deck 12 and a tool-or mowing-deck 14. Desirably, the mowing deck 14 is detachably connected to the power deck 12 to permit substituting for the mowing deck, either a snow blowing apparatus or a power sweeping apparatus, neither of which is shown herein.

The power deck 12 contains a bed 16 defined by a generally rectangular sheet metal plate 18 having down-turned flanges 20, 22 and 24 with flanges 20 and 22 being disposed along the laterally spaced sides of the bed, and flange 24 extending between, and interconnecting, the side flanges at the rear of the bed. An engine 26 is mounted on the upper surface of the bed 16 wherein a through-opening 28 is provided to accommodate passage of the engine drive shaft 30 to the underside of the bed plate 18. An inverted U-shaped bracket 32 has its down-turned legs 32a and 32b secured to the rear end of the bed 16 and its upwardly disposed platform portion mounting a fuel tank 34.

A pair of laterally spaced drive wheels, including left wheel 36 and right wheel 38, are disposed on opposite sides of the bed 16 in a manner hereinafter more fully described. Also, a pair of laterally spaced support arms 40 extend longitudinally forward from the bed 16 for attaching the mowing deck 14. The support arms 40 are fixedly secured at their respective rear ends to the bed and at their forward ends each mount left and right caster wheels 42 and 44, respectively, which are journalled for free rotation about a vertical axis by associated support shaft housings 46. As shown best in FIG. 3, the mowing deck 14 is mounted via laterally spaced brackets 48 carrying pivot pins 50 which pivotally engage the respective support arms 40 adjacent the forward ends thereof. A height adjusting mechanism 452 secures the rear end of the mowing deck 14 in a manner which permits height adjustment of the mowing deck.

Figure 4:
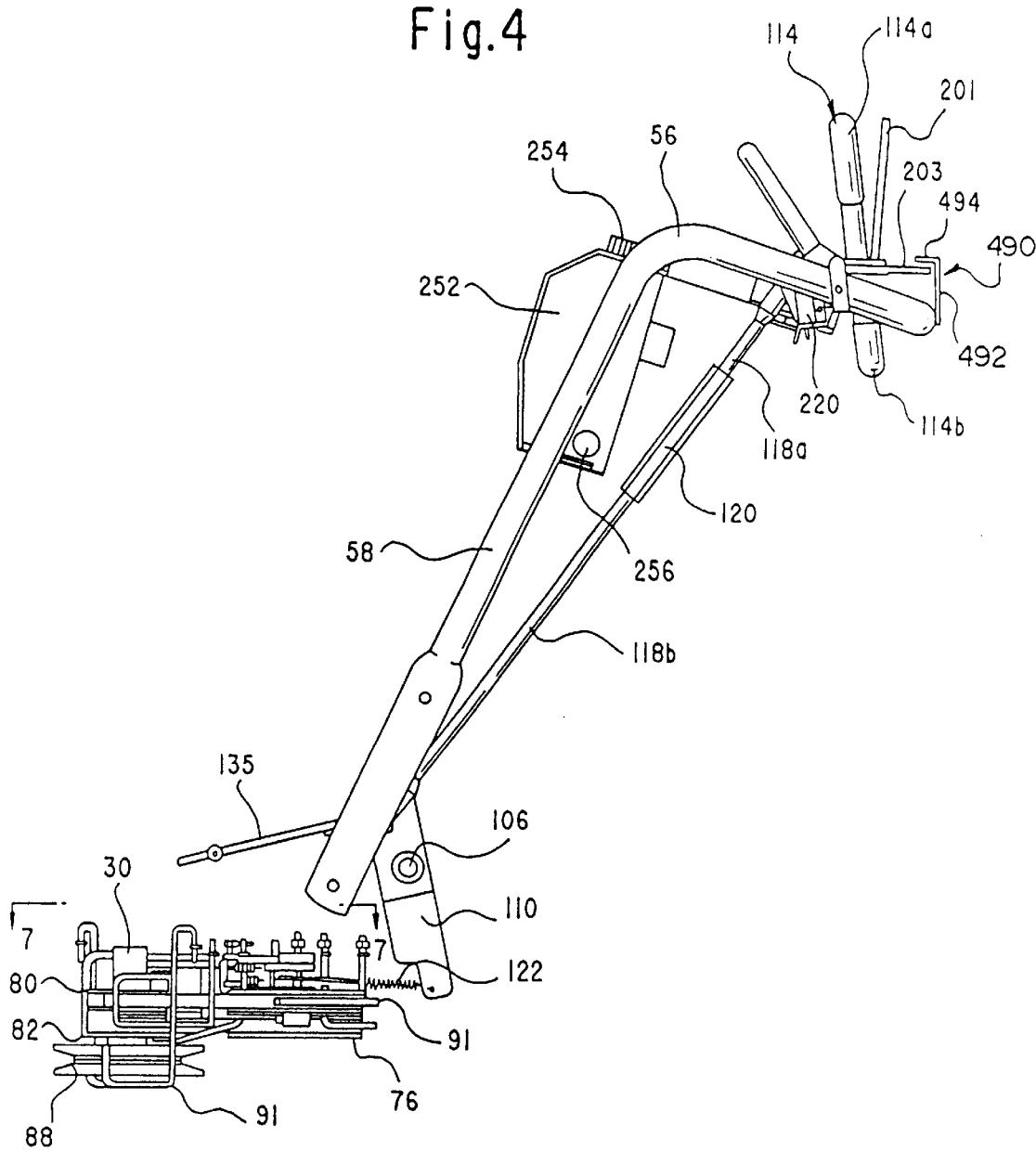
FIG. 4 is a partial side elevational view of the handle bar and control-operating handles mounted thereon employed on the mower of FIG. 1.
Figure 5:
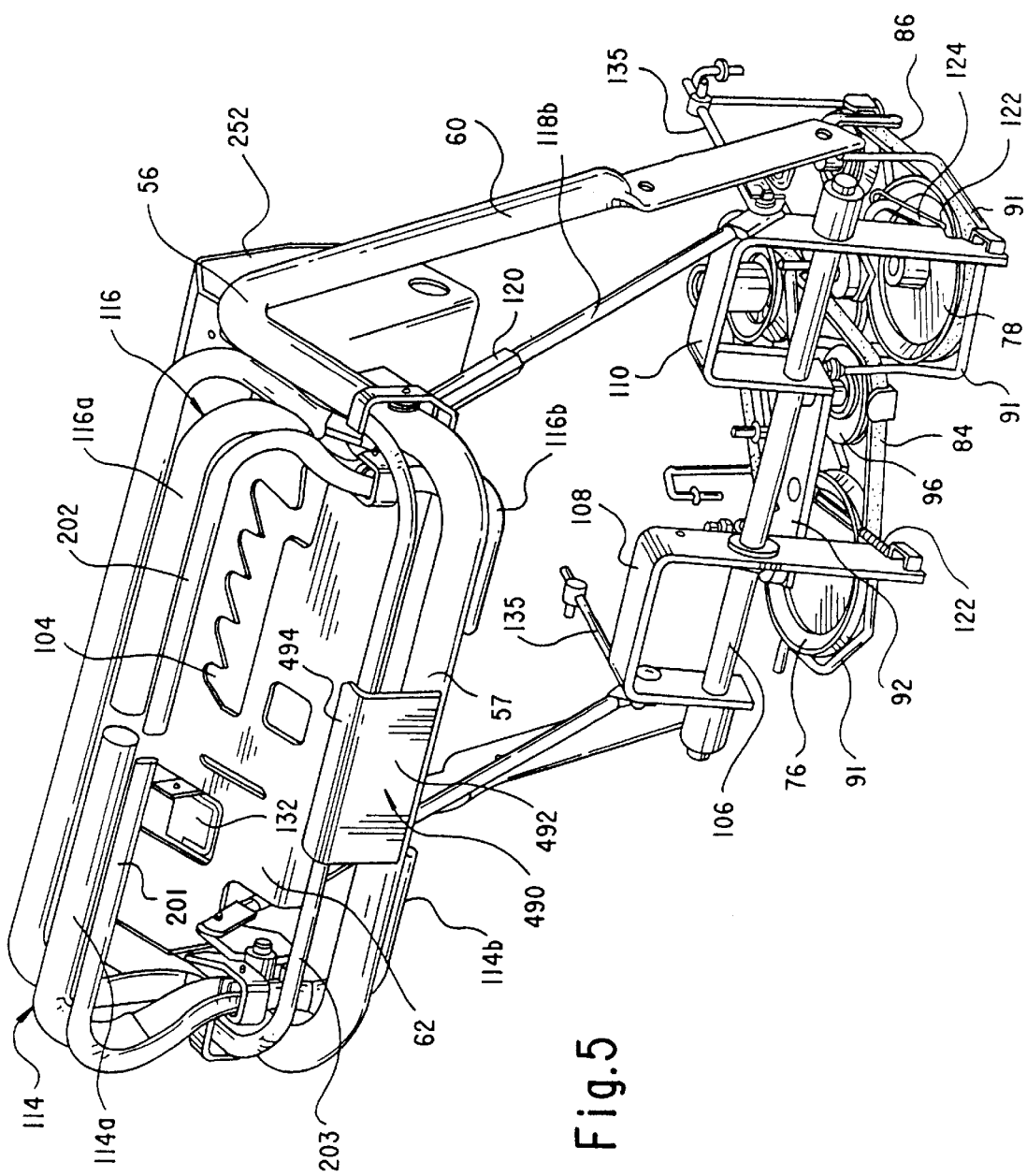
FIG. 5 is a partial perspective view illustrating in greater detail the control elements and the controlled element shown in FIG. 4.
Figure 6:
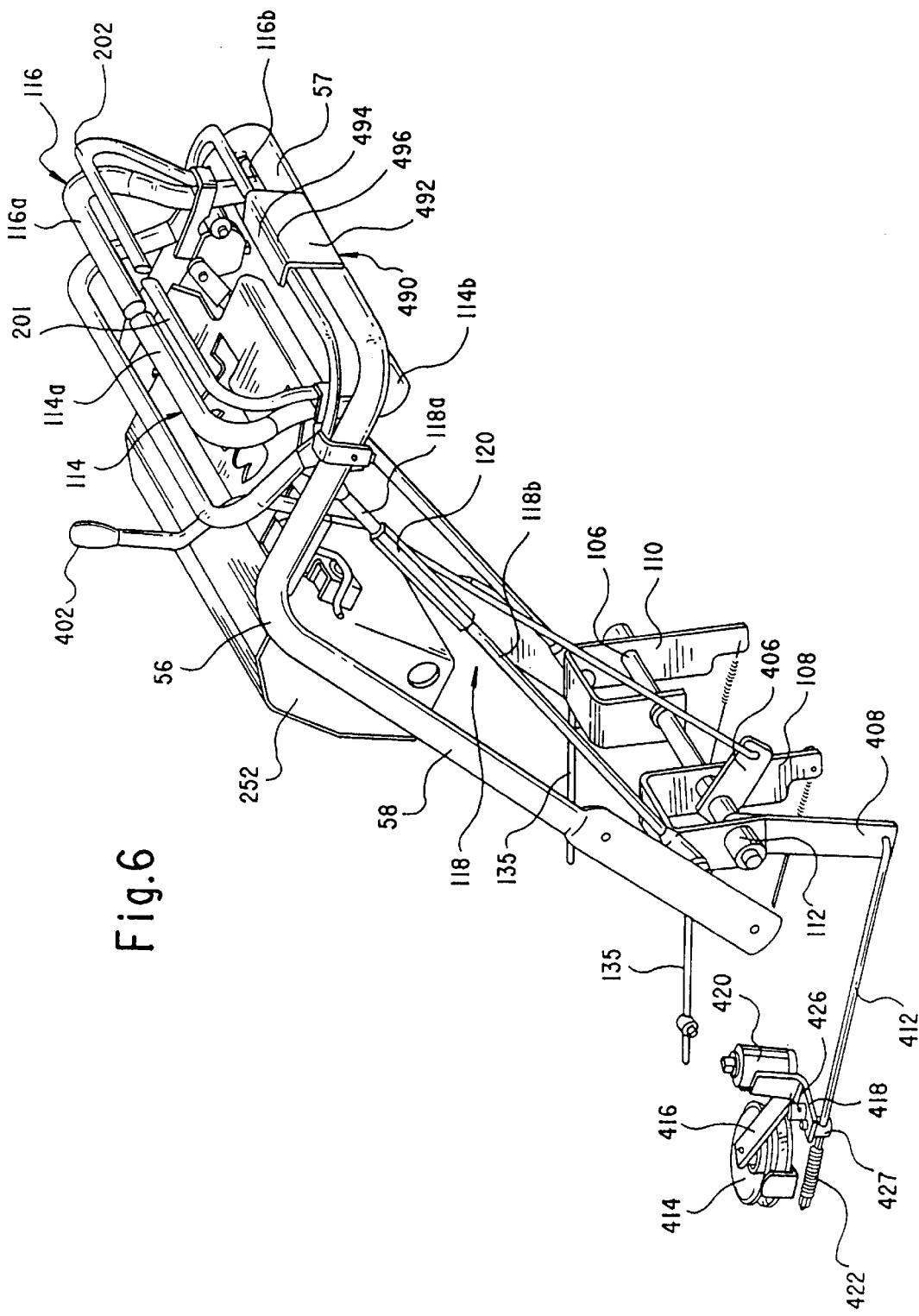
FIG. 6 is another partial perspective view of the control elements and the elements controlled thereby shown in FIG. 4.
Figure 7:
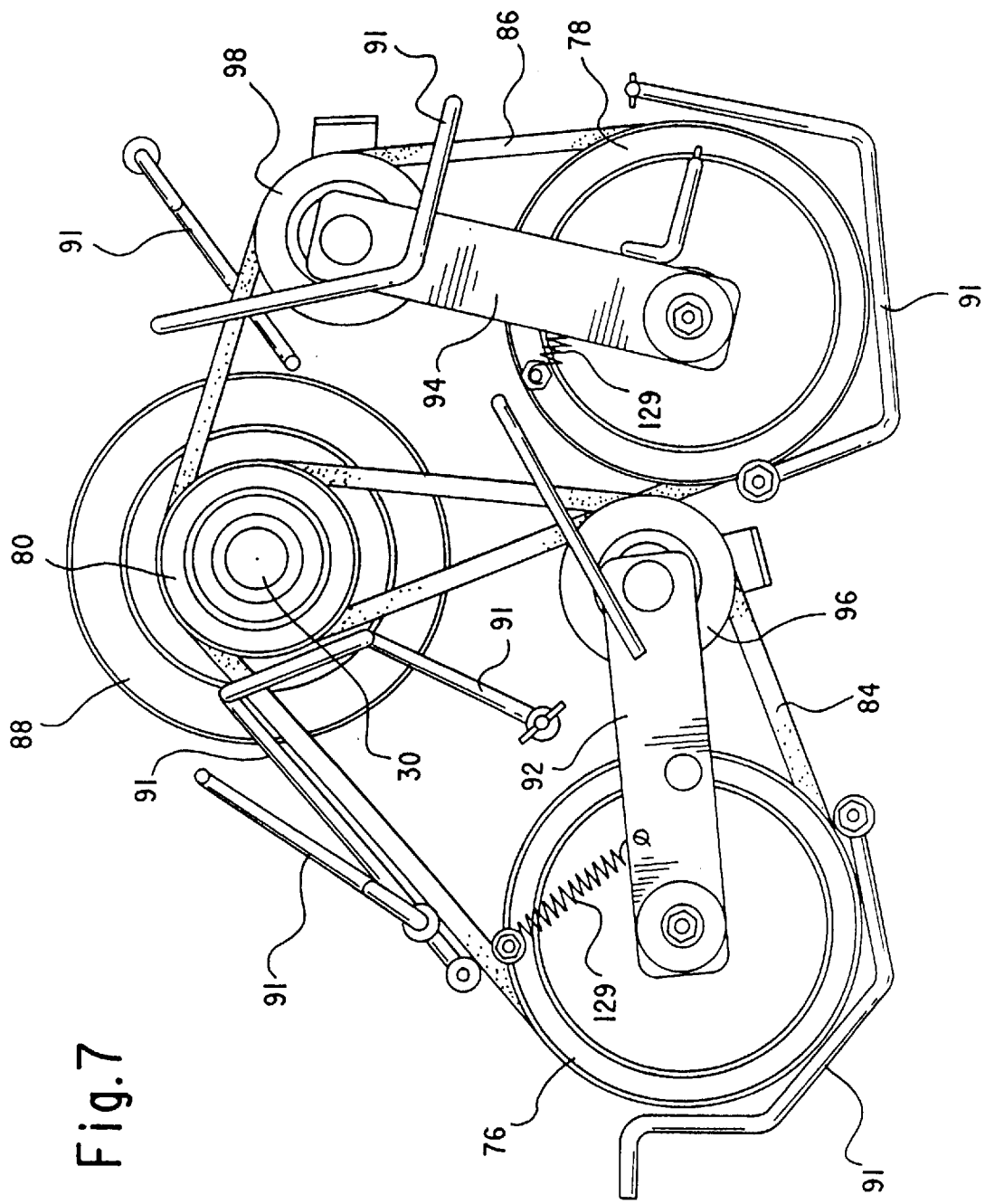
FIG. 7 is a view taken along line 7—7 of FIG. 4.
Figure 8:
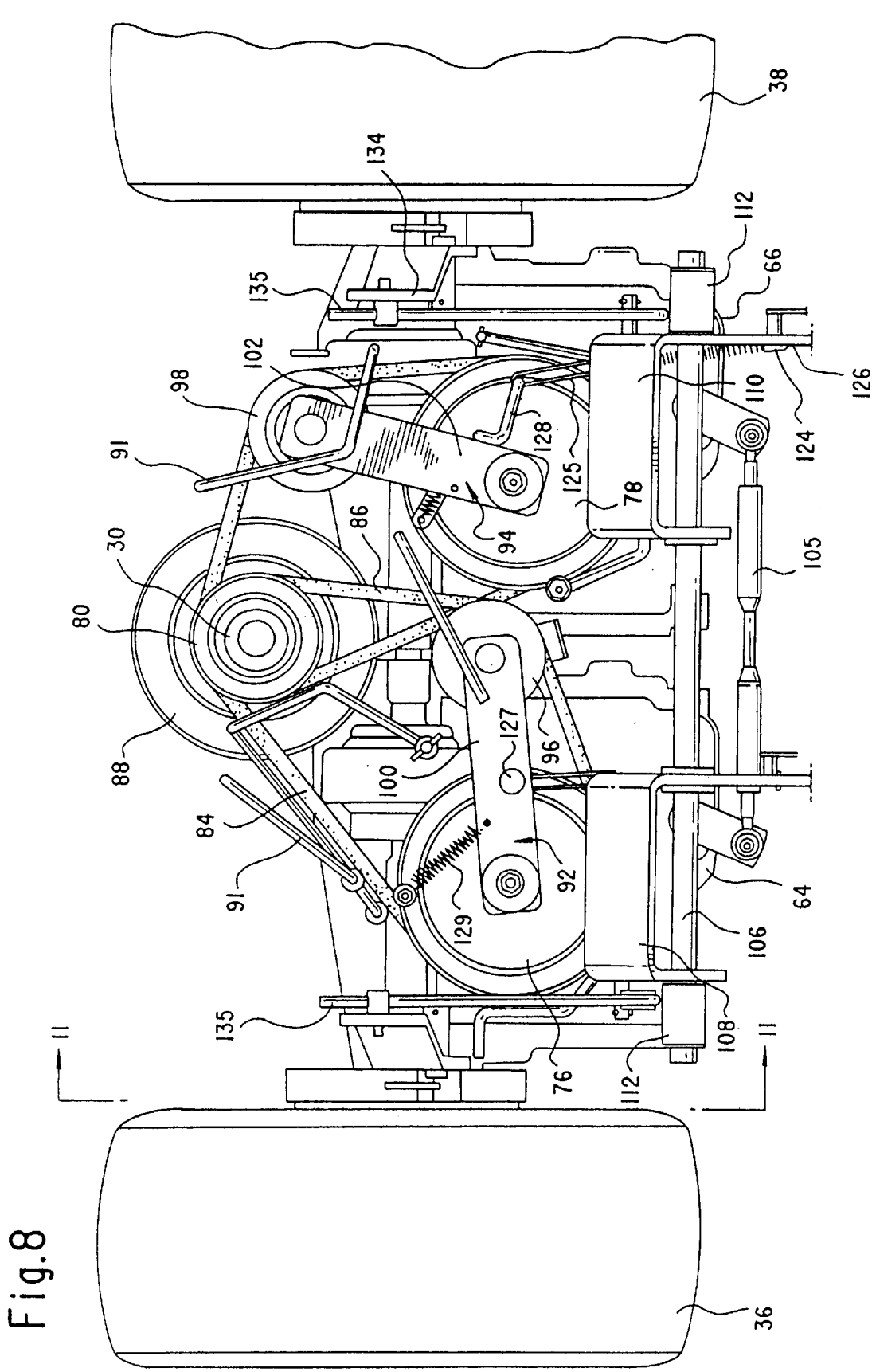
FIG. 8 is a plan view of the belt and pulley system employed for operating the drive wheels of the present invention.
Figure 9:
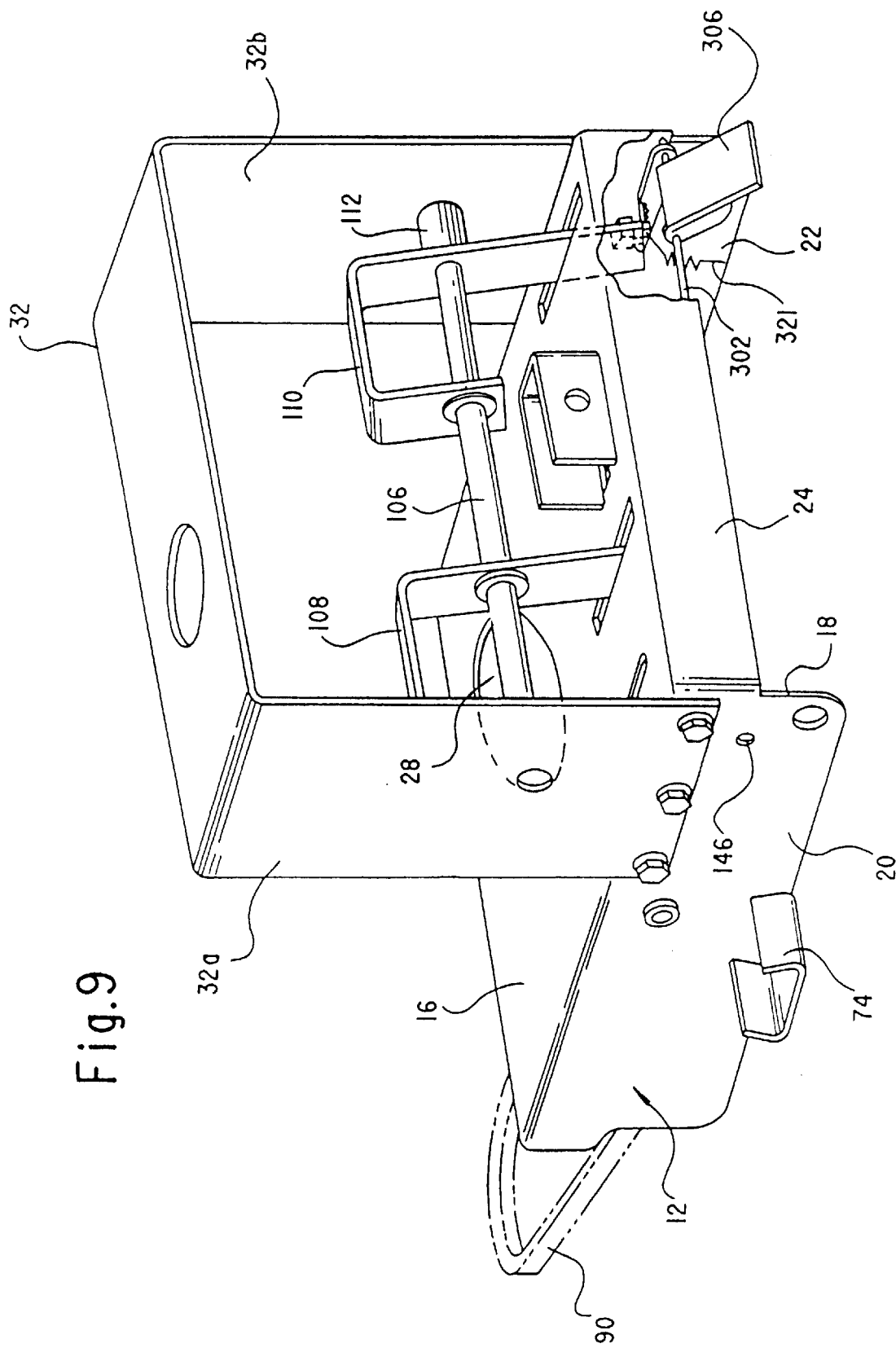
FIG. 9 is a partial perspective view of the power deck with drive levers and parking brake operator mounted thereon.
Figure 10:
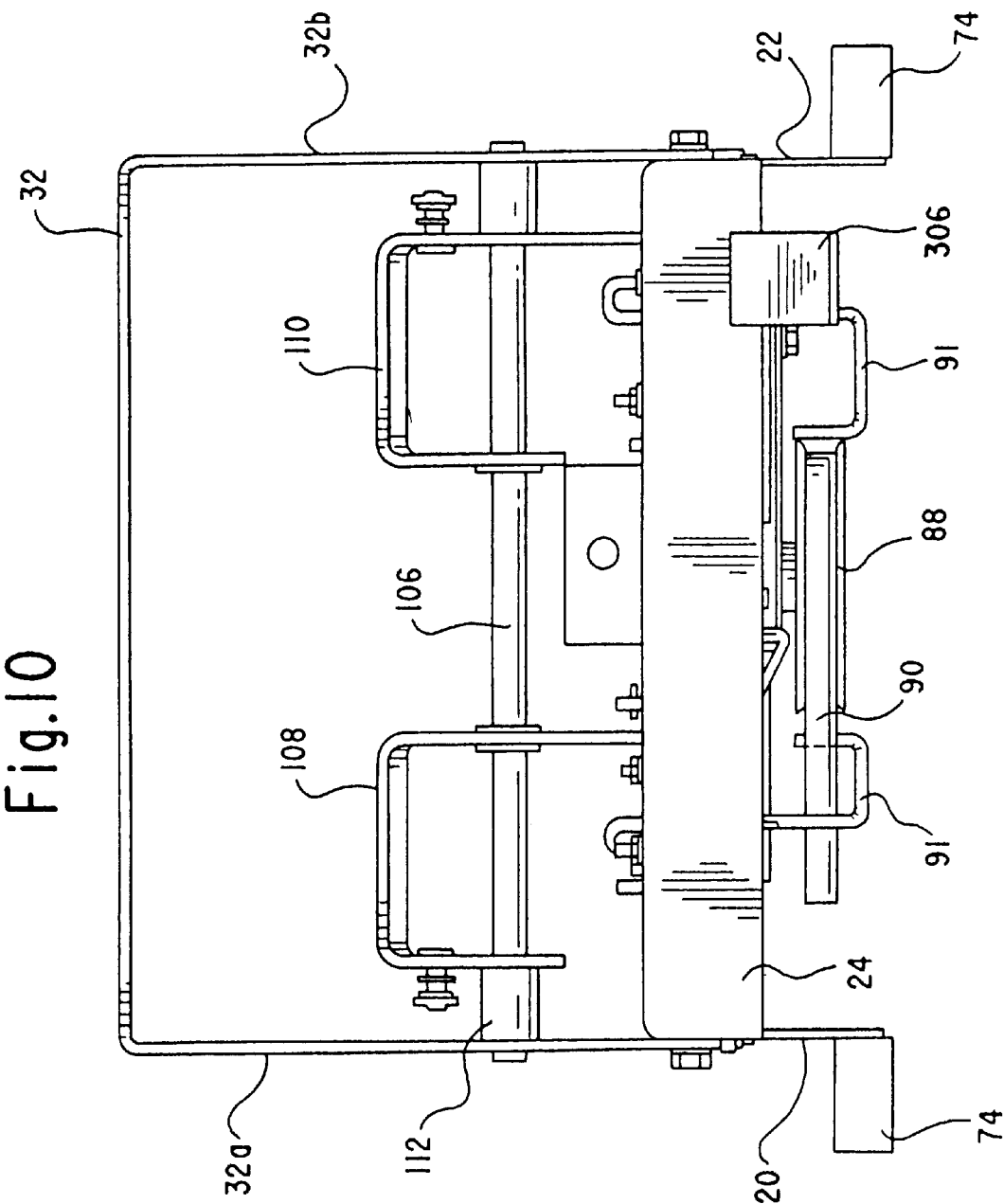
FIG. 10 is a rear view of the power deck and drive levers of FIG. 9.

As shown in FIGS. 4, 5 and 6, a handle bar 56 having a pair of left and right depending arms 58 and 60, respectively, is fixedly secured to the downturned legs of the bracket 32. A panel plate 62, that is substantially coextensive with the space along the handle bar 56 between the arms 58 and 60, provides access to control elements, as hereinafter are more fully described.

Drive Controls

With particular reference to FIGS. 3 to 11 of the drawings, lawn mower control apparatus is shown for controllably operating the left and right drive wheels 36 and 38. The control apparatus includes individual left and right gear-operated transmissions 64 and 66, respectively. The transmissions are mutually spaced laterally with respect to each other and each has a horizontally extending output shaft (not shown) extending in opposite directions away from each other with each output shaft being adapted to mount a hub of one of the drive wheels 36, 38. The transmissions are structurally interconnected on their respective facing ends by means of appropriate connecting structure (not shown) and are fixedly secured to the bed 16 of the power deck 12 by means of connectors (not shown) that attach posts which surround an output shaft bearing bushing 72 to laterally extending support ears 74 fixedly secured to the respective side flanges 20 and 22 of the power deck bed 16. Power input to each transmission 64, 66 is effected by a belt-driven input pulley, indicated as 76 on the left transmission 64 and as 78 on the right transmission 66. Each pulley 76 and 78 is fixed to, and rotatably drives, input shafts on the respective transmissions 64, 68 and extends substantially parallel to the engine drive shaft 30.

As indicated in FIGS. 4, 5, 7 and 8 of the drawings, the engine drive shaft 30, which rotates about a vertical axis, mounts a pair of vertically spaced pulleys 80, 82, about the respective ones of which the drive belts 84, 86 extend. Drive belt 84 extends between the uppermost pulley 80 on the engine drive shaft 30 and the pulley 76 on the input shaft to the left transmission 64. Drive belt 86 extends between the next lower pulley 82 on the engine drive shaft 30 and the pulley 78 on the input shaft to the right transmission 66. As shown, the input pulley 76 on the left transmission 64 is disposed slightly higher than pulley 78 on the right transmission and substantially level with the pulley 80 on the engine drive shaft 30. Similarly, the input pulley 78 on the right transmission 66 is disposed substantially level with the pulley 82 on the engine drive shaft whereby the drive belts 84 and 86 each operate in substantially level, horizontal planes.

A third pulley, termed "the power take-off (PTO) pulley," 88 is disposed at the lower end of the engine drive shaft 30 and is engaged by a drive belt 90 employed to rotatably drive the mower blades, as described hereinafter.

Belt guards, in the form of rod members 91 attached at one of their ends to the bed 16, have offset portions positioned closely adjacent the various belts and serve to prevent the respective belts from becoming dislodged from the pulleys which they engage.

Power input to the respective drive wheel transmissions is individually controllable by means of clutch element 92, 94 which are each in the form of idler pulleys 96, 98 that rotate on one end of pivotable lever arms 100, 102, respectively, whose opposite ends are pivotally secured to the undersurface of the metal bed plate 18. As shown best in FIG. 7, the lever arms 100, 102 which carry the respective idler pulleys 96, 98 are each disposed within the space surrounded by the drive belt with which each is associated. Return springs 129 which have one end connected to the bed 16 and the other end connecting each lever arm 100, 102 serve to normally bias the idler pulleys 96, 98 away from their respective drive belts 84, 86. Also, appropriate limit stops (not shown) extend from the bed plate 18 and serve to limit the angular displacements of the lever arms 100, 102 when they are pulled into disengagement by the return springs 129.

Each of the wheel drive transmissions 64 and 66 is a multi-speed geared transmission which produces discrete selected speeds that the panel plate 62 indicates by notches 104 as best shown in FIG. 5, and include four forward speeds, a reverse speed and a neutral position. A tandem controlled transmission shifting device 105 (FIG. 8) is operative to jointly change the gear of the respective transmissions 64, 66. Geared transmissions, suitable for use in the practice of the invention, are those made by Dana Corp. under Model No. 4360-102.

Separate control members operate the clutch elements in order to vary torque transmission between the output of the engine drive shaft 30 and the input to the respective left and right drive transmissions 64, 66. Thus, as shown in the drawings, the bracket 32 on the power deck 12 mounts a support shaft 106 which extends between, and is fixed at its ends, to the respective legs 32a and 32b of the bracket. Drive levers 108 and 10 having the general shape of an inverted J and disposed at axially spaced locations along the shaft 106 contain clearance openings in the legs of the levers which enable the levers to undergo controlled pivoted movement about the shaft. Spacers 112 serve to separate the drive levers 108, 110 from the respective legs 32a, 32b of the bracket 32. Each of the drive levers 108, 110 is independently operated by a respective one of a pair of control handles 114, 116 which are disposed for pivotal movement on the handle bar 56 and that contain transversely extending upper portions 114a, 116a to facilitate manual manipulation by the machine operator. A connecting rod 118 extends between and connects the respective control handles 114, 116 to each drive lever 108, 110. Axial adjustment of the respective connecting rods with respect to their associated drive lever can be effected by a turnbuckle 120 which connects an upper portion 118a to a lower portion 118b of each connecting rod.

Each drive lever 108, 110 attaches at a depending leg portion a drive spring 122 which extends forwardly from the drive lever and is generally axially stiff. The springs 122 have at one end a hook 124 that engages an opening 126 in the depending leg of the drive lever 108 and 110. The other end of each spring 122 contains an elongated loop 125 forming a lost motion space and that, with regard to the left idler pulley 96, engages a pin 127 which depends from the underside of the lever arm 100. With regard to the right idler pulley 98, and in order to accommodate the unequal vertical spacing between the drive belts 84 and 86, the looped end 125 of the associated spring 122 engages the lower end of bent pin 128 whose upper end is fixed, as by means of welding, or the like, to the edge of the right idler pulley lever arm 102.

Thus, operation of the mower in the forward direction involves, first, the transmissions 64 and 66 associated with the respective wheels 36 and 38 being placed by the operator in a selected drive range, as determined by placement of the shift lever 130 in an appropriate notch 104 in the panel plate 62. To propel the mower straight forwardly both upper control handles 114a and 116a are simultaneously moved forwardly whereupon the drive levers 108 and 110 are pivoted about the support shaft 106 in a direction to extend the drive springs 122 rearwardly which causes the lever arms 100 and 102 carrying the idler pulleys 96 and 99 to be controllably urged into engagement with the respective drive belts 84 and 86 thereby adjusting the tension of the respective drive belts about the pulleys they engage. Such adjustment alters the torque transmission from the engine drive shaft 30 to the left and right transmissions 64 and 66, respectively, within the selected gear range. To steer the mower 10, the operator need only push or pull one control handle with respect to the other whereupon the driving force to one drive wheel with respect to the other is altered thereby causing the course of the machine to be altered.

Reverse propulsion of the mower 10 is accomplished by, first, moving the shift lever 130 to the reverse position in the notches 104. Then, the lower control levers 114b and 116b of the control handles 114 and 116 are pulled rearwardly. This rearward motion of the lower control handles 114b and 116b has the same effect as the forward motion of the upper control handles 114a and 116a. The mower 10 may be steered in reverse in the same manner as the forward driving.

Figure 11:
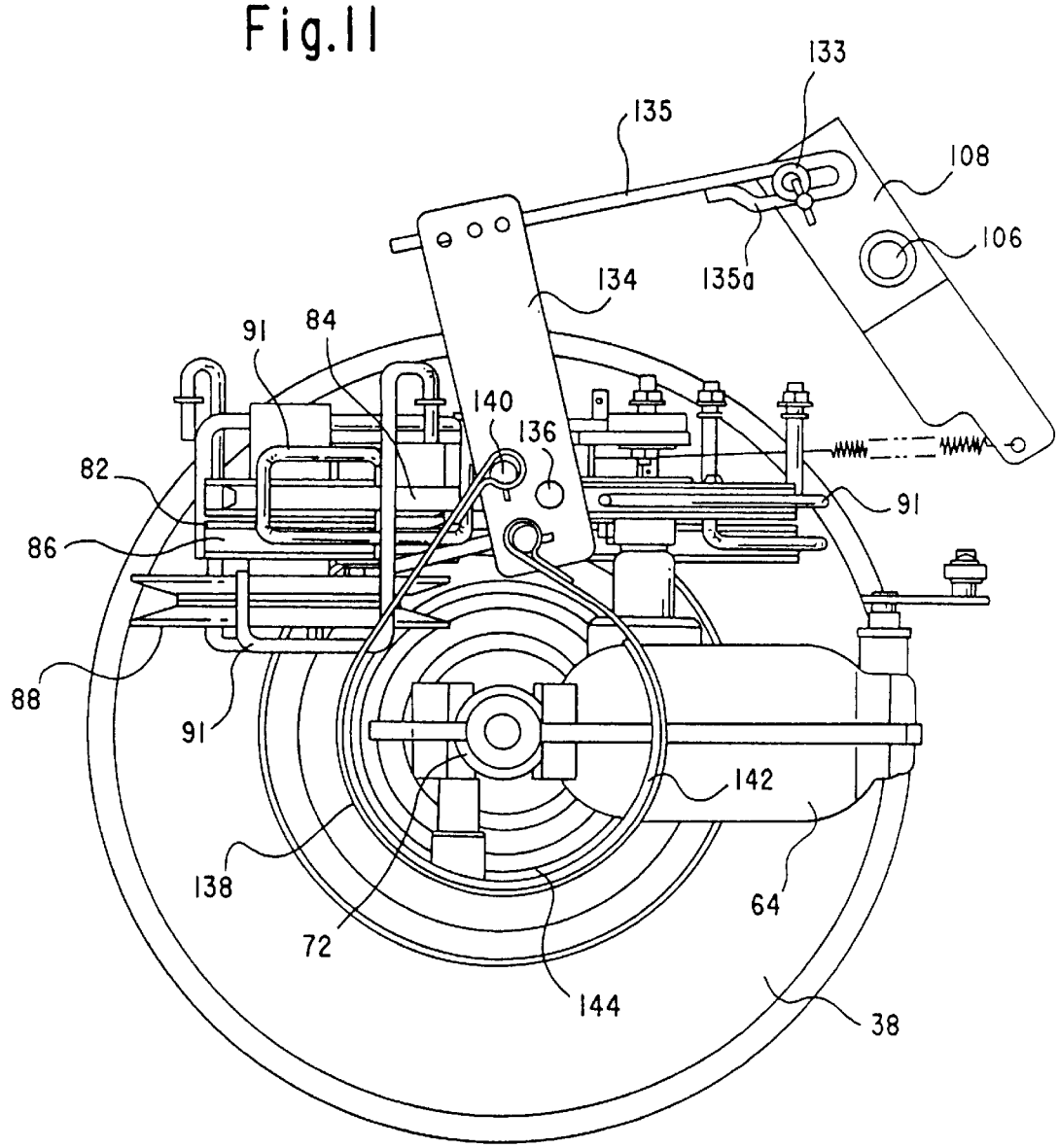
FIG. 11 is a partial elevational view with portions removed taken along line 11—11 of FIG. 8.

Braking of the respective drive wheels 36 and 38 in order to stop forward movement of the machine, or to augment its turning movements, is effected by the operator pivotally moving one or the other, or both of the control handles 114 and 116 in a direction opposite to that required for effecting rotation of the drive wheels 36, 38 for forward movement. Thus, to brake the left drive wheel 36, for example, the control handle 114 which controls operation of the left drive wheel is pivoted, either by pulling its upper control handle 114a backwardly or by pushing its lower control handle 114b forwardly. By imparting such movement to the control handle 114, the connecting rod 118, which interconnects the left control handle 114 with the left drive lever 108, causes the drive lever 108 to rotate in a clockwise direction, as viewed in FIG. 11, whereupon the left brake lever 134 which connects to the drive lever 108 via connecting link 135 is pivoted in a clockwise direction about pivot pin 136 to cause brake band 138 whose ends connect with the brake lever via pin connectors 140 to constrict the brake pad 142 about the brake drum 144 on the wheel. Note that the brake drum 144 for the left wheel 36 has been omitted for clarity and that FIG. 11 shows only the brake drum 144 that is connected to the right wheel 38.

The connecting link 135 includes an elongated loop 135a that forms a lost motion coupling with the drive levers 108 and 110. This loop 135a allows the drive levers 108 and 110 to rotate counterclockwise (as viewed in FIG. 11) to engage the idler pulleys 96 and 98 with their respective drive belts 84 and 86 without imparting further motion onto the brake levers 134 which would cause further separation of the brake bands 138 from the brake drums 144.

The simultaneous braking of both drive wheels 36 and 38 is effected by performing the above-described operation simultaneously on both control handles 114 and 116. Alternatively, in order to augment turning of the machine, one of the drive wheels can be substantially fully, or only partially, braked while the other drive wheel continues to be driven forwardly so as to effect a tight turn.

Safety Cut-Off System

The safety cut-off system in accordance with the instant invention will be described in connection with the figures set forth below.

FIGS. 1–6 illustrate the overall view of the mower including the arrangement of the handle bar controls. As illustrated in FIGS. 4–6, left forward presence lever 201 and right forward presence lever 202 are disposed near left upper control handle 114a and right upper control handle 116a. Furthermore, the generally elongated shape of left forward presence lever 201 and right forward presence lever 202 generally follows the elongated shape of upper left control handle 114a and tipper right control handle 116a. Furthermore, as noted in FIGS. 5 and 6, the generally elongated shape of reverse presence lever 203 is similar to the elongated shape of the generally horizontal end portion 57 of handle bar 56. As seen in FIGS. 3 and 4, in profile, left forward presence lever 201, right forward presence lever 202 and reverse presence lever 203 are generally flat so that they may be easily be grasped together with another bar. Left forward presence lever 201 is easily grasped together with left upper control handle 114a, while right forward presence lever 202 is conveniently grasped together with upper right control handle 116a. Accordingly, reverse presence lever 203 is conveniently grasped together with horizontal end portion 57 of handle bar 56, in addition to lower control levers (or reverse control levers) 114b and 116b.

Figure 14:
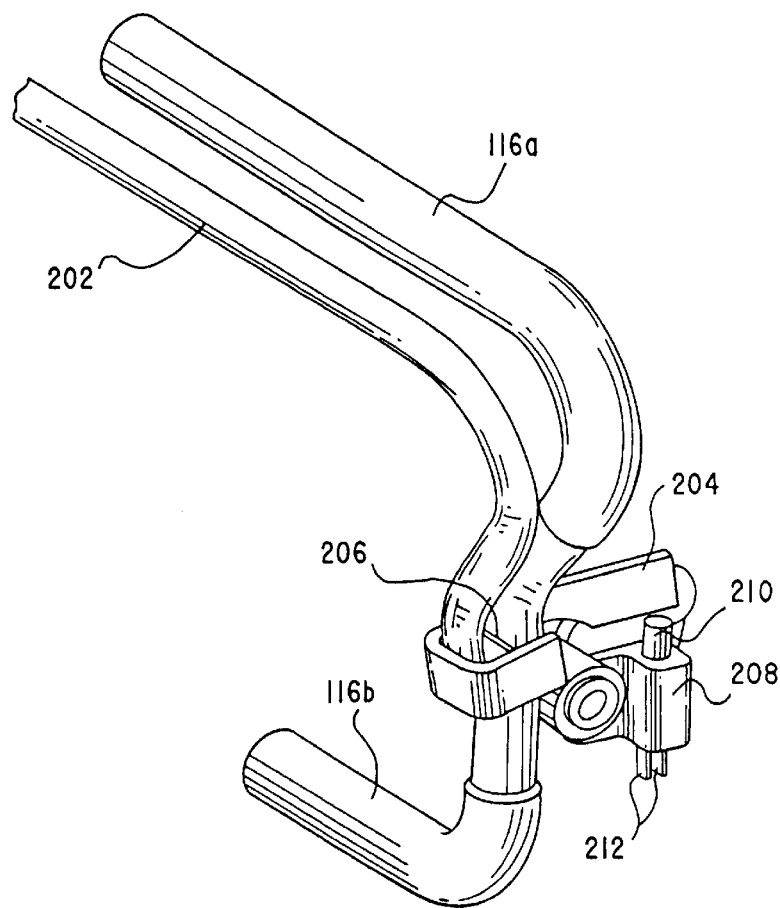
FIG. 14 is a partial perspective view of the operating handle and presence lever for forward operation of the drive wheel on the right side of the lawn mower shown in FIG. 1.

FIG. 14 is a partial perspective view isolating right forward presence lever 202 along with its corresponding upper right control handle 116a and lower right control handle 116b. Specifically, as noted, right forward presence lever 202 generally follows the shape of upper right control handle 116a. Accordingly, wherever it is possible to grasp upper right control handle 116a, right forward presence lever 202 is also easily grasped at the same time. Because the control handle 116 is pivotable with respect to handle bar 56 through a relative large angle, right forward presence lever 202 is pivotably mounted directly to the right control handle 116. In fact, since right forward presence lever 202 pivots with respect to right control handle 116, it is always near to upper right control handle 116a, no matter how little or how far upper right control handle 116a is pivoted. Normally open, right forward sensor switch 208 is fixed with respect to right control handle 116. Furthermore, a switch arm 204 extends generally forwardly from right forward presence lever 202 and is fixed with respect thereto. A spring 206 is provided between right forward presence lever 202 and upper right control handle 116a, such that right forward presence lever 202 is biased in the OFF state (disengaged state) and thus switch arm 204 is not engaged with plunger 210. When right forward presence lever 202 is grasped together with upper right control handle 116a, that is, the right forward presence lever 202 is now in the ON state (engaged state) switch arm 204 accordingly pivots and presses down plunger 210 of switch 208. This action causes switch 208 (which is a normally open switch) to be closed and thus to conduct electrical current between contacts 212, to which control wires are connected. The arrangement of the left forward presence lever with respect to the left control handle 114 is substantially a mirror image of the right forward presence lever 202 and right control handle 116, illustrated in FIG. 14. FIG. 3 illustrates left forward presence lever switch 220 which is opposite the right forward presence lever sensor switch 208.

Figure 15:
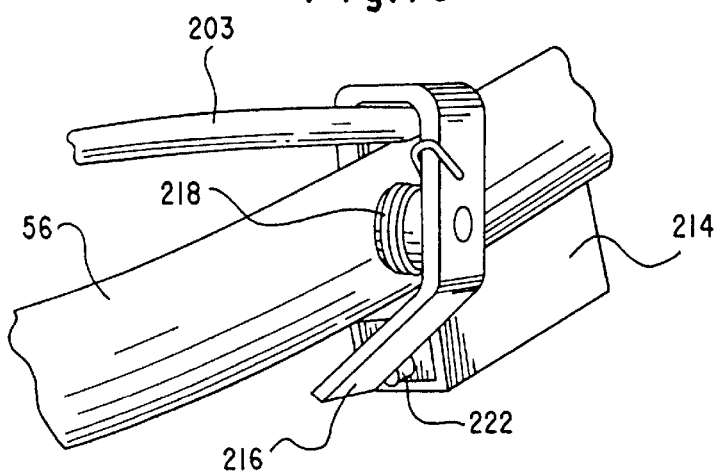
FIG. 15 is a view similar to FIG. 14 showing the operating handle and presence lever for reverse operation of the drive wheel on the right side of the lawn mower shown in FIG. 1.

FIG. 15 illustrates the relationship between the reverse presence lever 203 and handle bar 56. Handle bar 56 is fixed with respect to the mower. Also, as seen in FIGS. 5 and 6, the generally horizontal end portion 57 of handle bar 56 is generally parallel with reverse presence lever 203. Reverse presence lever 203 is pivoted with respect to handle bar 56. When reverse presence lever 203 is grasped together with horizontal end portion 57 of handle bar 56, reverse presence lever 203 is substantially adjacent horizontal end portion 57 of handle bar 56. A reverse presence lever switch arm 216 extends downwardly from reverse presence lever 203 and is adaptable to engage plunger 222 of reverse presence lever sensor switch 214. When reverse presence lever 203 is in the OFF state, it is biased away from horizontal end portion 57 of handle bar 56 by spring 218. Reverse presence lever sensor switch 214 is a normally open switch. Thus, when reverse presence lever 203 is in the OFF state (disengaged state) reverse presence lever sensor switch 214 is maintained open. When the reverse presence lever 203 is grasped together with horizontal end portion 57 of handle bar 56, switch arm 216 is pivoted to contact plunger 222 and accordingly to close sensor switch 220.

Figure 16:
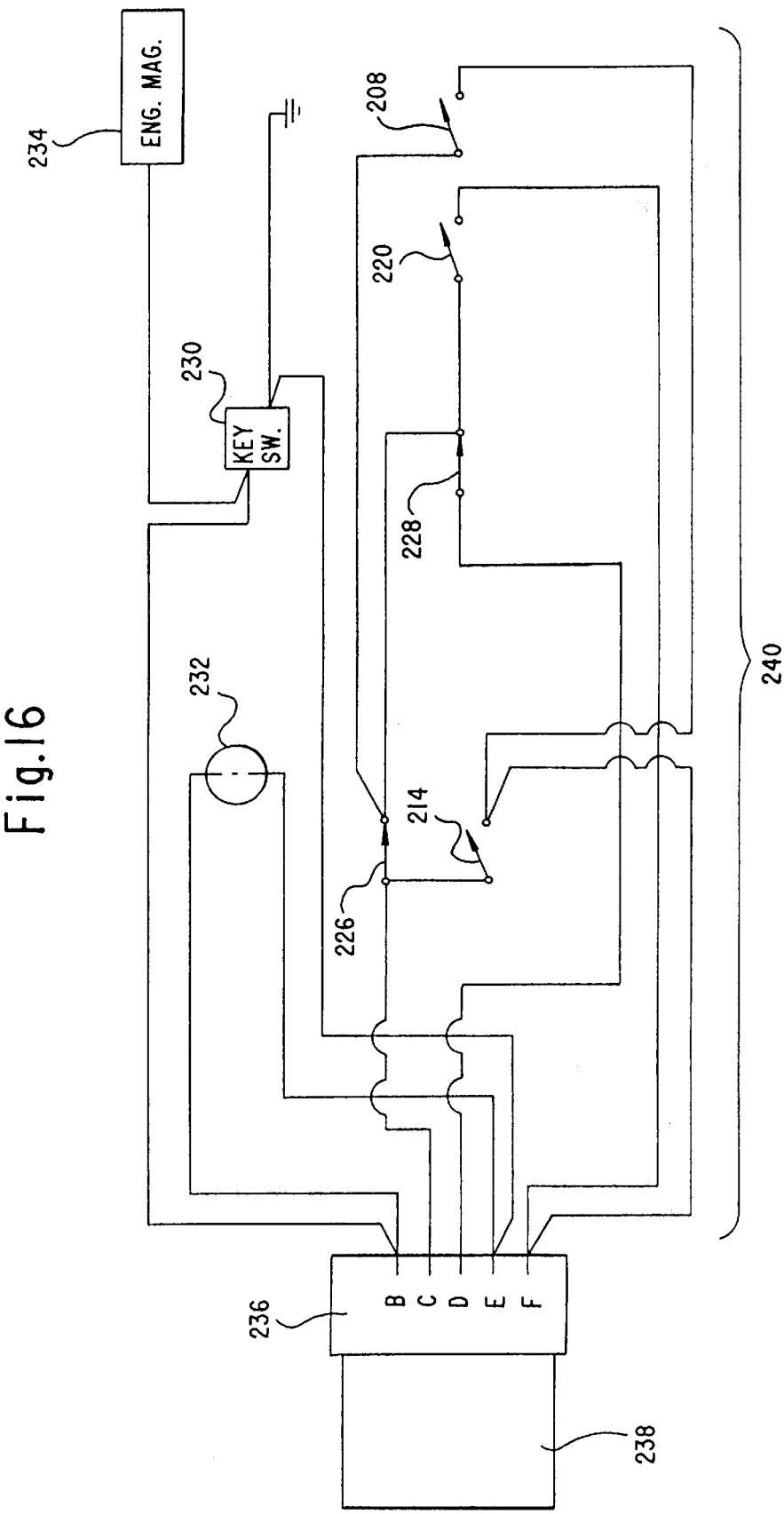
FIG. 16 is a schematic representation of the control circuitry for the lawn mower of the present invention.

FIG. 16 is a schematic diagram of the control circuit layout for controlling the safety cut-off system in response to the operation of the presence levers and control levers. Reference numeral 240 generally refers to the circuit for controlling the safety cut-off system. Circuit 240 is connected to connection block 236 with labeled connections B–F. Connection block 236 is in turn connected to switching module 238, which is available from Alphabet Wire Harness as Model No. 135331. Of course, module 238 may be any type of a switching module with relays, switches, electronic switches, a programmed logic array, or any other appropriate switching device.

Engine magneto 234 is connected to key switch 230 and is also connected to contact B. Key switch 230 is normally open when the engine is running. The opposite side of key switch 230 is connected to ground, thus when key switch 230 is closed, the engine magneto is grounded and the mower is prevented from running. On the side of key switch 230, opposite the engine magneto, key switch 230 is also connected to contact E. An hour meter 232 is connected between contact points B and E. Contact point C is connected to a front side of reverse gear sensor switch 226 (normally closed) and to the front side of reverse presence lever sensor switch 214. The back side of reverse gear sensor switch 226 is connected to a first lead of left forward presence lever sensor switch 220 and in parallel to a first lead of right forward presence lever sensor switch 208. The first lead of left forward presence lever sensor 220 is also connected to a first lead of power take-off sensor switch 228 (normally closed). The second lead of power take-off sensor switch 228 is connected to contact D. The second lead of left forward presence lever sensor switch 220 is connected to contact F. The second lead of right forward presence lever sensor switch 208 is connected to a second lead of reverse presence lever sensor switch 214 and to contact F.

During operation, in its most basic sense, one or both of the forward presence levers 201, 202 are pushed forward (into the ON state) when the lawn mower is neutral or forward gear, and while pushing forward on the upper control handles 114, 116. When the lawn mower is in reverse gear, the reverse presence lever 203 is depressed onto the horizontal end portion 57 of handle bar 56, while pulling backward on lower control handles 114b, 116b. Module 238 functions to connect contact E (at ground potential) to contact B to provide a ground level signal to the engine magneto and thus prevent the motor from running. When contact C is connected to contact D or F, then the connection between contact B and contact E is broken, and thus contact B is no longer at ground potential, therefore enabling the motor to run.

As noted, reverse gear sensor switch 226 is normally closed. This means that when reverse is gear engaged, switch 226 becomes open. When switch 226 becomes open, the only way for contact C to conduct to contact F is through reverse presence lever sensor switch 214. In order words, the only way to prevent cutting-off of the motor is to engage (put into the ON state) the rear presence lever 203. Thus, if the gear shift is in the reverse gear, irrespective of the status of right forward presence lever switch 208, left forward presence lever switch 220 and power take-off sensor switch 228, the reverse presence lever sensor switch 214 must be closed in order to prevent a cut-off of the motor.

When the lawn mower is in neutral or a forward gear, reverse gear sensor switch 226 is closed. Accordingly, any one of reverse presence lever sensor switch 215, left forward sensor switch 220, or right forward sensor switch 208 may be closed (either of the two forward presence levers or the reverse presence levers in the ON state) in order to prevent contact B (and thus the engine magneto) from being grounded.

Power take-off lever sensor switch 228 is normally closed. That is, when the power take-off unit is engaged, the switch is open, and when the power take-off unit is disengaged then switch 228 is closed.

A clear view of how the schematic diagram of FIG. 16 works can be seen with reference to the following table A.

TABLE A

| No. | Gear | PTO | Right Fwd PL | Left Fwd PL | Rev PL | Engine |
|---|---|---|---|---|---|---|
| 1 | N-4 | ON | OFF | OFF | OFF | OFF |
| 2 | N-4 | ON | ON (OFF) | OFF (ON) | OFF (ON) | ON |
| 3 | N-4 | OFF | OFF (ON) | OFF (ON) | OFF (ON) | ON |
| 4 | R | OFF | OFF | OFF | OFF | OFF |
| 5 | R | OFF | ON (OFF) | OFF (ON) | OFF | OFF |
| 6 | R | OFF | OFF (ON) | OFF (ON) | ON | ON |
| 7 | R | ON | OFF | OFF | OFF | OFF |
| 8 | R | ON | ON (OFF) | OFF (ON) | OFF | OFF |
| 9 | R | ON | OFF | OFF | ON | ON |

As can be seen from Table A, the different status of the right forward presence lever, the left forward presence lever and the reverse presence lever affect the engine depending on which gear is selected and whether the power take-off unit (PTO) is engaged (ON) or disengaged (OFF). Specifically, items 1–3 illustrate the situation in which the gear selector is in neutral or forward gears 1–4. In this situation, if the PTO is on, the engine will be prevented from running if neither the right forward presence lever 202, the left forward presence lever 201 nor the reverse presence lever 203 are in the ON position. Item 2 indicates that if one of the three presence levers is ON, then the motor or engine will not be prevented from running. Item 3 indicates that if the PTO is OFF and neutral or a forward gear is selected, then the position of the presence lever does not matter and the engine is not prevented from running.

Items 4–9 indicate the situation in which the lawn mower is in reverse gear. As can be seen in items 4–9, whether the PTO is ON or OFF, the only condition which will allow the motor to be ON is when the reverse presence lever 203 is also in the ON state.

Parking Brake

The disclosed mower includes a parking brake assembly identified generally by reference numeral 300 and described with particular reference to FIGS. 9, 11, 12 and 13 of the drawings. The parking brake apparatus for the respective drive wheels 36 and 38, includes the drive levers 108, 110, which operate to constrict the brake bands 138 about the hubs of the respective drive wheels through activation of brake levers 134 by the respective drive levers and connecting links 135 which rigidly connect the brake levers to the drive levers.

The parking brake assembly 300 includes an operating shaft 302 which extends laterally across the rear of the bed 16 of the power deck 12, with the opposite ends of the shaft being mounted for rotation in openings 146 formed in the side flanges 20 of the bed plate 18. A pedal arm 304 having a foot pedal 306 attached at its free end is fixedly secured to the operating shaft 302, whereby the operating shaft is caused, when activated, to rotate in a counter-clockwise direction, as viewed from the right hand end in FIG. 12.

Figure 13:
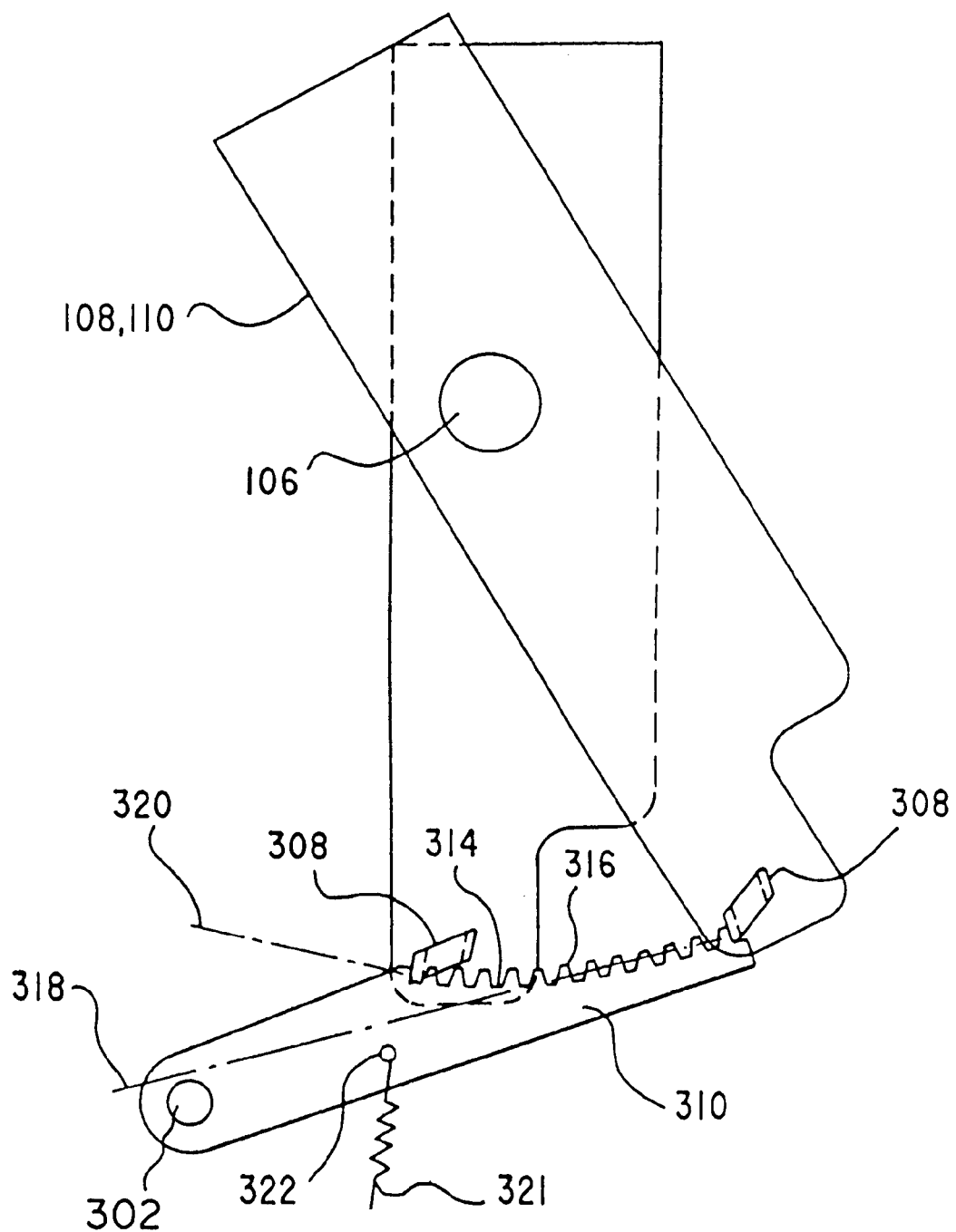
FIG. 13 is a schematic view illustrating parking brake operator elements in various positions.

As shown in the drawing figures, each drive lever 108, 110 has a pawl 308 in the form of an inclined U-shaped projection extending from a side surface of a depending leg of the drive lever. The operating shaft 302 contains a pair of locking fingers 310 and 312, each of which contains an upwardly facing side edge 314 having an arcuately formed portion adjacent the free end and having locking teeth 316 thereon adapted to engage the pawls 308. In order to facilitate engagement of the pawls 308 on the drive levers 108, 110 with the locking teeth 316 on the locking fingers 310, 312, the free ends of the teeth are arcuately formed. Also, as shown in FIG. 13 which illustrates a drive lever 108, 110 in both of its extreme positions of engagement with the locking levers, the inclination of the pawls 308 and the disposition of the teeth 316 along the locking finger edge 314 is such as to ensure a full surface engagement of the pawl with the teeth wherein the engagement force vectors are substantially normal to the engaging surface on the pawl, as indicated by direction lines 318 and 320.

According to the invention, the locking finger 310 is fixed, as by means of welding, to the operating shaft 302 so as to rotate with the shaft. A return spring 321, which is connected at one end to a hole 322 in the locking finger 310 and whose other end is fixed with respect to the bed 16, biases the locking finger 310, and consequently the shaft 302, in a direction away from the drive levers. This bias is overcome when the foot pedal 306 is depressed.

Locking finger 312 is connected to the operating shaft 302 in a manner as to permit a restricted amount of relative movement with respect to the shaft in order to provide a lost motion function between the locking finger and the shaft. As shown, the locking finger 312 has a clearance hole 324 through which the operating shaft 302 loosely passes. A pair of radially extending pins 326 and 328 are fixed to the shaft at axially spaced locations therealong. Pin 326 is positioned closely adjacent the right side of locking finger 312, as viewed in FIG. 12, and pin 328 is located at a position remote from the left side of the locking finger. A torsion spring 330 surrounds the operating shaft 302 between the left side of locking finger 312 and the radial pin 328. A tang 332 on the right end of the torsion spring 330 attaches the locking finger 312 via a connecting hole 334 therein. The left end of the torsion spring 330 contains an arm (not shown) which bears against radial pin 328. During assembly of the torsion spring onto the shaft, the spring is pre-loaded in a tightening direction so as to bias the movable locking finger 312 upwardly toward the adjacent pawl 308, with such upward movement being limited by engagement of the tang 332 with the radial pin 326.

Figure 12:
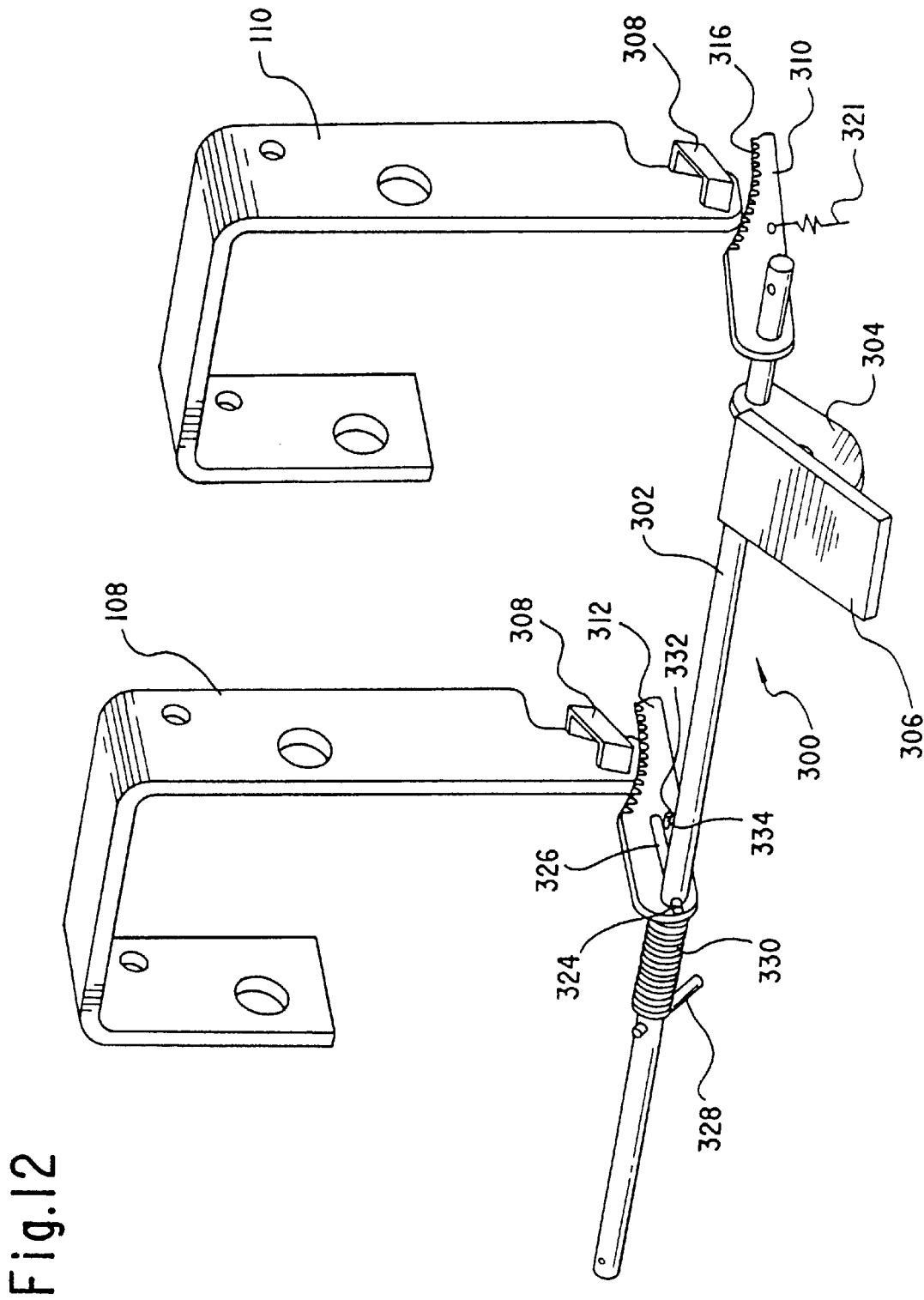
FIG. 12 is a perspective view of the parking brake operator elements of the present invention.

As is evident from consideration of FIG. 12, the locking fingers 310 and 312 are not angularly aligned about the operating shaft 302. Instead, the movable finger 312 is displaced angularly upwardly with respect to the fixed finger 310 so as to engage the pawl 308 on drive lever 108 prior to engagement by the fixed finger 310 with the pawl 308 on drive lever 110. As a result of this construction, depression of the foot pedal 306 by the machine operator causes, first, the teeth 316 on the movable locking finger 312 to engage the pawl 308 on the drive lever 108 in order to lock the drive lever, and concomitantly, the associated brake lever 134 in their counter-clockwise positions to hold the brake band 138 constricted about the brake drum 144 of the left drive wheel. Immediately, thereafter, the fixed locking finger 310 is brought into engagement with the pawl 308 on drive lever 110 so as to secure the drive lever in its braked condition, limited continued rotation of the operating shaft 302 being permitted due to the lost motion function effected by the coupling of locking finger 312 to the operating shaft 302 through the torsion spring 318.

The operation of the described parking brake assembly 300 is as follows. When the drive control handles 114 and 116 that connect with drive levers 108 and 110, respectively, are pulled backward by the machine operator, the brake bands 138 constrict brake pads 142 about the brake drums 144 to apply a braking force to the respective drive wheels 36, 38. The residual forces developed in the brake bands 138 bias the control handles 114 and 116 to a neutral position on the handle bar 56, which position is intermediate their "drive" position and their "brake" position. Coincident with this, drive levers 108, 110 and their associated brake levers 134 tend to move in a counterclockwise direction as viewed in FIG. 11.

The parking brake function is initiated by the machine operator depressing the foot pedal 306 with the wheel brakes being manually applied and the control handles 114, 116 being held by the operator in their "brake on" or rearward position. Consequently, operating shaft 302 is rotated counter-clockwise to move the locking fingers 310, 312 toward the pawls 308 on the respective drive levers 108, 110 whereupon locking teeth 316 on the movable locking finger 312, which is upwardly biased out of alignment with fixed locking finger 310, are caused to engage the pawl 308 on the drive lever 110. With the torsion spring 330 providing a lost motion coupling between the movable locking finger 312 and the operating shaft 302, the shaft continues to rotate until the locking teeth 316 on the locking finger 310 engage the pawl 308 on drive lever 110.

A force perpendicular to the end face of the pawl 308 results when the teeth 316 engage the pawl 308. This force is the result of the inclination of the pawl 308 and the bias on the drive lever 108, 110 to rotate clockwise. The direction of this force is represented in FIG. 13 by lines 318 and 320 for the two positions illustrated.

The force generated between the teeth 316 and the pawls 308 is directed over the pivot (i.e., the center of the operating shaft 302) of the locking fingers 310 and 312. This force tends to rotate the locking fingers 310 and 312 upwardly (counterclockwise). However, the pawls 308, which are attached to the drive levers 108 and 110, tend to rotate clockwise to the "neutral" position of the drive levers 108 and 110. Thus each engaged member has a force applied to it that biases each member further into engagement.

This perpendicular force creates a frictional force between the engaged tooth 316 and the pawl 308. The frictional force is perpendicular to the force along line 318 or 320. The frictional force counteracts the force of the return spring 321 attached to the locking finger 310. The interaction of the perpendicular force, the friction force and the return spring force creates a self-locking relationship between the pawls 308 and the locking fingers 310 and 312. Therefore, the parking brake assembly remains engaged.

For releasing the parking brake, the machine operator pulls the control handles 113, 116 rearwardly. Such action causes movement of the drive levers 108, 110 in a clockwise direction which results in the pawls 308 being removed from engagement with the locking teeth 316. When this occurs, the force resisting the return spring 321 is removed and the fixed locking finger 310 falls away from its associated pawl 308 thereby moving with it the operating shaft 302 and the movable locking finger 312 whereupon the parking brake becomes fully disengaged.

From the foregoing, it is evident that the described parking brake organization is of simple, inexpensive construction, yet is effective for its intended purpose and, moreover, as compared with comparable devices of the prior art, permits location of the parking actuator in an uncongested, easily accessible location on the mower.

Blade Brake Assembly

Figure 17:
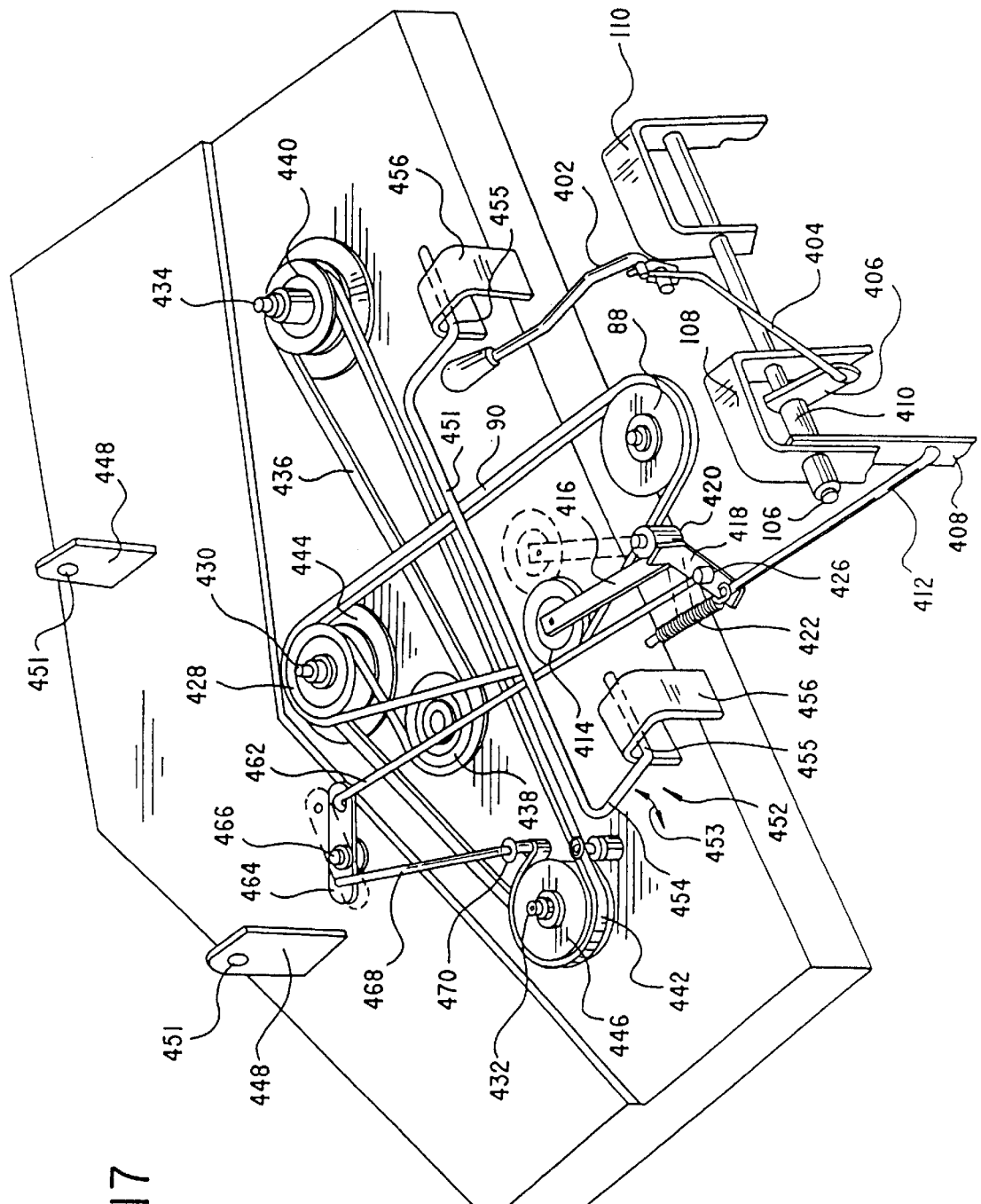
FIG. 17 is a partial perspective view of the blade brake and operating elements thereof for the lawn mower of the present invention.

The blade brake assembly in accordance to the instant invention is operated when the power take-off unit is disengaged. Specifically (as seen in FIG. 17), the power take-off unit includes a power take-off (PTO) drive pulley 88 driven by the motor, and PTO drive belt 90 driven by the PTO drive pulley 88. Mower deck drive pulley 428 is engaged with PTO drive belt 90 and is driven by it. Mower deck drive pulley 428 is attached to and co-axial with shaft 430 which drives the center mower blade. A mower deck drive belt 436 is threaded around center mower deck pulley 444, immediately beneath mower deck drive pulley 428 and also supported on shaft 430. The mower deck drive belt 436 is also threaded around right side mower deck pulley 440, which is supported on shaft 434 which also support the right side mower blade. The mower deck drive belt 436 is furthermore threaded around left side mower deck pulley 442 which is disposed immediately beneath the blade brake assembly 446 and is supported on left side shaft 432 which also supports the left side mower blade. A mower deck tension pulley 438 provides proper tension on mower deck drive belt 436 for driving all three mower blades. PTO idler pulley 414 is inserted in contact with PTO drive belt 90 between PTO drive pulley 88 and mower deck drive pulley 428. When PTO idler pulley 414 is engaged with PTO drive belt 90 and is biased outwardly, the power take-off unit is engaged and the mower deck drive pulley 428 is driven. When PTO idler pulley 414 is shifted inwardly (as shown in phantom) so that it no longer applies tension on PTO drive belt 90, the power take-off unit is disengaged. In other words, mower deck drive pulley 428 is not driven.

PTO idler pulley 414 is shifted inwardly to disengage the PTO unit. PTO idler pulley 414 is shifted inward in response to PTO control lever 402, as best seen in FIGS. 6 and 17. PTO control lever 402 is connected by way of upper rod 404 to first arm 406. First arm 406 is fixed with respect to second arm 408 by way of collar 410. Collar 410 is supported by and rotates around shaft 106. Second arm 408 is connected by way of lower rod 412 to a lower mounting fitting 427. Furthermore, a damping spring 422 is provided on a remote end of lower rod 412, on the opposite of lower mounting fitting 427 from second arm 408. An idler pivot 420 fixed to the power deck includes first PTO idler arm 416 and second PTO idler arm 418. First PTO idler arm 416 extends outwardly from idler pivot 420 and rotatably supports PTO idler pulley 414. Second PTO idler arm 418 extends outwardly from idler pivot 420 and provides a mounting surface for lower mounting fitting 427 which provides for a pivotal connection with rod 412. An tipper mounting fitting 426 is provided on the upper portion of second PTO idler arm 418. In response to the movement of rod 412, second PTO idler arm 418, and in turn first PTO idler arm 416 pivots about idler pivot 420, thus causing PTO idler pulley 414 to move inwardly (as shown in phantom) and outwardly with respect to the PTO drive belt 90. Belt guide 424 is simply provided to prevent PTO drive belt 90 from slipping off of PTO idler pulley 414 as it releases its tension and moves inwardly with respect to the belt. Thus, when PTO idler pulley 414 is shifted inwardly, the PTO unit is disengaged.

As illustrated in FIG. 3, the lawn mower having a blade braking system in accordance with the instant invention is adjustable for different cutting heights. Specifically, as seen in FIG. 3, the mower deck 14 is illustrated in its high position. It is also illustrated in its low position 15, as indicated in phantom. The lawn mower is supported on the ground by drive wheels 36, 38 in the rear and by caster wheels 42, 44 in the front. Support arms 40 are fixed with respect to the power deck 12. At the forward end of support arms 40, the caster wheels 42, 44 are supported. A support shaft housing 460 is fixed to the forward end of each support arm 40, and supports a caster support shaft 458 therein. Support housing 460 is adjustable up and down along the length of caster support shaft 458, in order to raise and lower support arms 40 with respect to the caster wheel and the ground. Preferably, spacers 480 (see FIG. 2) may be inserted or removed from below each support shaft housing 460 in order to raise or lower it with respect to the associated caster wheel. Mower deck 14 is mounted to support arm 40 by way of a pair of brackets 448 (FIG. 17) which are supported on support arm 40 by way of pivot pin 450 (FIG. 3) being inserted in opening 451 of bracket 448 (FIG. 17). While the left side is being described, it should be noted that the right side is similar.

As illustrated in FIGS. 3 and 17, a height adjusting mechanism is generally indicated by the arrow 452 and includes a pivot bar 454 which pivots (through angle 453) with respect to support arms 40 and has an inwardly extending engaging end 455. Pivot bar 454 pivots about a pivot portion 451 (see FIG. 17). The engaging end 455 supports bracket 456 which is fixed to the top of the lawn mower deck. As seen in FIGS. 2 and 3, a deck height lever 482 is fixed to a forward end of pivot bar 454. Deck height lever extends upwardly with a remote end easily grasped by an operator. A notched adjustment track 484 is in interlocking engagement with deck height lever 482, wherein deck height lever 482 is incrementally shiftable with respect to notched adjustment track 484 into one of a number of predetermined positions indicated by a notch in notched adjustment track 484. Each predetermined position represents a different cutting height. Since deck height lever 482 is fixed to pivot bar 454, as deck height lever 482 is pivoted, pivot bar 54 pivots or rotates (through angle 453) with respect to support arm 40, and inwardly engaging ends 455 shift downwardly with respect to support arm 40. Since engaging ends 455 support brackets 456 and thus mower deck 14, as engaging ends 455 shift downwardly, so do brackets 456 and accordingly mower deck 14. However, mower deck 14 is pivoted at pivot pin 450 (FIG. 3). Thus, the mower deck pivots downwardly and does not remain level with respect to the ground. This causes two concerns. The first concern is maintaining the mower deck and the mower blade in a position substantially parallel to the ground. This is accomplished by adjusting the height of support shaft housing 460 with respect to caster support 458. Therefore, when the mower deck 14 is adjusting downwardly or upwardly by the height adjusting mechanism 452, the support shaft housings 460 are also adjusted to compensate.

A second concern arising from the pivoting deck is the proper connection of a linkage to the blade brake for braking the mower blades when the PTO unit is disengaged. This solution will be described below.

Figure 18:
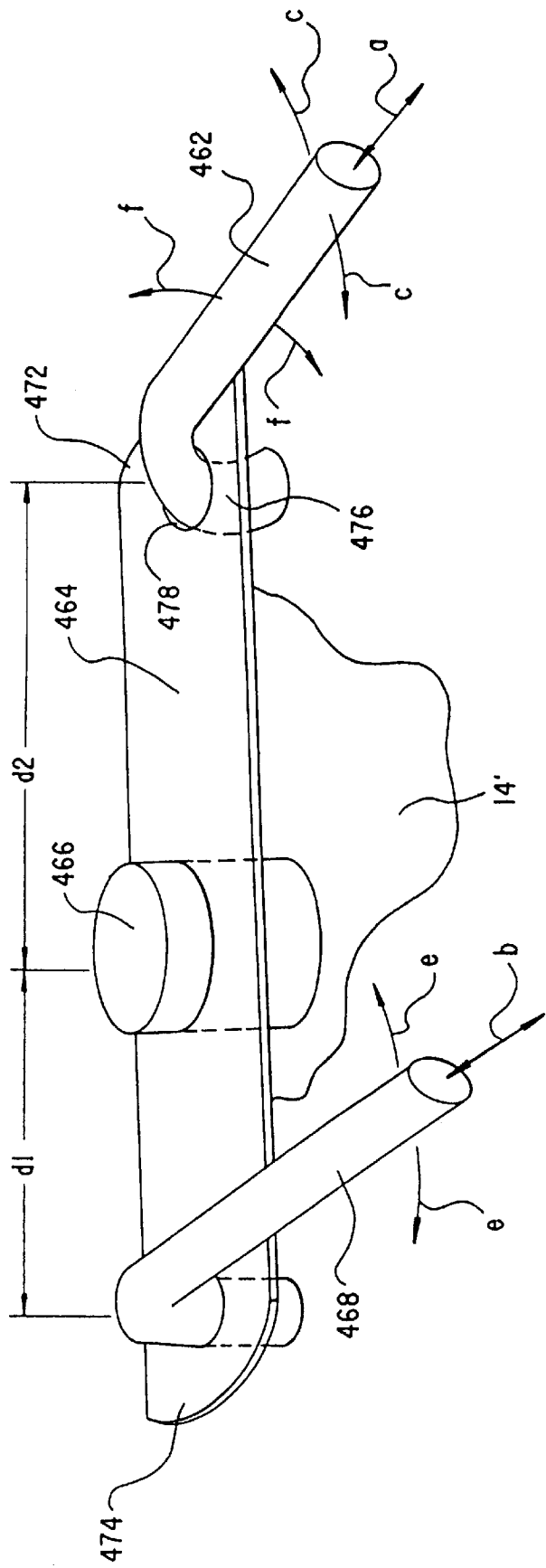
FIG. 18 is a more detailed partial perspective view of the blade brake and operating elements thereof shown in FIG. 16.

When the PTO is disengaged, then ANSI regulations require the blades to stop moving within specified amount of time. Thus the blade brake should be applied when the lawn mower is shifted into the PTO disengaged state. Accordingly, as illustrated in FIG. 17, actuating rod 462 is connected to second PTO idler arm 418 by way of pivotable upper mounting fitting 426. Actuating rod 462 extends forwardly from second PTO idler arm 418 to pivot lever 464. Pivot lever 464 pivots about a center pivot 466 which is fixed to mower deck 14 (illustrated as 14' in FIG. 18). Pivot lever 464 (as seen in FIGS. 17 and 18) transfers the longitudinal reciprocating movement of actuating rod 462 indicated by arrow a into the longitudinal reciprocating movement of link member 468 indicated by arrow b. Center pivot 466 and pivot lever 464 are fixed to the mower deck at a point near the mower deck pivot pin 450 which pivots in openings 451 of brackets 448. As noted in FIG. 18, the forward end of actuating rod 462 has a connecting end 476 extending generally perpendicular to the actuating rod 462. Connecting end 476 is inserted into an oversize hole 478 such that actuating rod 462 is pivotable in two different angular directions with respect to pivot lever 464. Actuating rod 462 pivots in a direction generally parallel to the plane of the pivot lever 462 as indicated by arrow c. Furthermore, because of the oversize hole 478 and the connecting end 476 of actuating rod 462, actuating rod 462 is also pivotable in a direction not parallel to the plane of pivot lever 464. In fact, actuating rod 462 is pivotable in a direction generally perpendicular to the plane of pivot lever 464 as indicated by arrow f. Link member 468 extends from a pivotal connection with a second end 474 of pivot lever 464 to connect with band brake 446. A support ring 470 (FIG. 17) is fixed to the mower deck to support an end of link member 468 nearest the band brake. As link member 468 shifts toward the band brake, the band brake is applied, braking the left mower blade and the other mower blades by way of mower deck drive belt 436. As illustrated in FIG. 18, it is preferable that the distance between the center pivot 466 and the connection of pivot lever 464 with actuating rod 462 indicated by d2 is greater than the distance from center pivot 466 to the connection between pivot lever 464 and link member 468 (indicated by d1). Since the pivot lever 464 is located near pivot pin 450 of the mower deck, the pivotability of actuating rod 462 in two different angular directions compensates for the pivoting of the mower deck when raising and lowering the height adjustment. Furthermore, because actuating rod 462 is a long rod and pivoted at pivot lever 464, any large change in lateral movement of actuating rod 462 at the end nearest the power deck is reduced to a smaller amount near pivot lever 464. Furthermore, when d2 is greater than d1, any difference in longitudinal motion of actuating rod 462 (between high and low cutting levels) is accordingly reduced in the longitudinal motion of link member 468. Thus, the pivoting movement of the mower deck when changing cutting height is compensated for without requiring continued adjustment of the blade brake itself, and thus enabling the blade brake to always be in proper alignment, since it is fixed with respect to the location of center pivot 466 and pivot lever 464.

In operation, when the operator moves the PTO control lever 402 to select a disengaged state for the PTO unit, motion is transmitted through upper rod 404, first arm 406, collar 410, second arm 408, lower rod 412, through lower mounting fitting 427 to pivot second PTO idler arm 418 about idler pivot 420. When idler pivot 420 pivots in the clockwise direction, first idler arm 416 and PTO idler pulley 414, rotatably attached thereto, are pivoted in turn. As PTO idler pulley 414 is shifted inwardly, the tension on PTO drive belt 90 is removed and power to mower deck drive pulley 428 is removed. As second PTO idler arm 418 moves forwardly, so does actuating rod 462, because it is pivotally connected to second PTO idler arm by way of pivotable tipper mounting fitting 426. As actuating rod 462 moves forward, pivot lever 464 pivots about center pivot 466 and causes link member 468 to be moved longitudinally toward band brake 446 and thus apply band brake 446 to thereby stop the rotation of the mower blades.

When the PTO control lever 402 is returned to the engaged state to engage the PTO unit, each of the above elements operates in tile reverse way to release band brake 446 and thus to allow the mower blades to spin freely.

Ballast System

The ballast system in accordance with the instant invention can best be seen with reference to FIGS. 3–6. Ballast tank 252 is illustrated in these figures. The ballast system in accordance with the instant invention is used with a lawn mower 10 having a power deck 12 and a mowing deck 14. An engine or motor 26 is positioned on bed 16 of power deck 12 for driving left and right drive wheels 36, 38. Mower deck 14 is attached to and extends forwardly from power deck 12 and is supported at its front end by caster wheels 42, 44. A fuel tank 34 is supported on bracket 32 located at the rear portion of power deck 12. Depending arms 58, 60 extend upwardly and rearwardly from the power deck and are fixed to and supported by bracket 32. Ballast tank 252 is supported between depending arms 58, 60 of the handle bar 56. As seen most clearly in FIGS. 3 and 4, ballast tank 252 is disposed near the end of handle bar 56, remote from power deck 12. FIGS. 3 and 4 illustrate a filler cap 254 or opening the top of ballast tank 252 to fill the interior volume with the desired ballast, whether water, sand or any other appropriate ballast. Draining cap 256 allows the ballast to be easily drained out from ballast tank 252.

As clearly seen in FIG. 3, ballast tank 252, disposed near an end of handle bar 56, is located behind the center line of drive wheels 36, 38. In fact, the ballast tank 252 is disposed behind the rearmost portion of drive wheels 36, 38. Furthermore, it should be noted that ballast tank 252 is disposed at least partially behind fuel tank 34.

In operation, the filler cap 254 may simply be removed by the operator and ballast tank 252 may be filled with water, sand or any other appropriate ballast. Cap 254 may then be replaced. The appropriate ballast in ballast tank 252 will change the center of gravity of the lawn mower itself. It will aid to counter balance the mower deck 14 attached on the front of the power deck 12. This will aid in handling the lawn mower in tight places, or under any other circumstances. Because ballast tank 252 is disposed high up on handle bar 56, in order words, near the end of handle bar 56, this arrangement increases the movement arm of any ballast in ballast tank 252, thus increasing the efficiency of any such ballast. When finished, the user may drain the ballast through drain cap 256.

It should also be noted that although the above description has been set forth with regard to the mower deck 14, the power deck 12 may also be employed with a snow blower, auxiliary unit, a power sweeper auxiliary unit or many other types of auxiliary units. As an example, the lawn mower deck may have a different weight than the snow blower auxiliary unit or the power sweeper auxiliary unit. Accordingly, because the ballast tank 252 has an interior volume that may accept varying amounts of ballast, the ballast tank 252 may be filled full, or may be partially filled to compensate for different weights of the different auxiliary units, such as the mower deck, the snow blower auxiliary unit and the power sweeper auxiliary unit.

It will be appreciated that the power tool drive apparatus described herein, utilizing gear-operated drive transmissions, produces operating characteristics and features which heretofore were unique to equipment employing hydrostatic transmissions for transmitting engine power to the drive wheels. The disclosed arrangement provides a compactness of form which enables all of the components, which define the drive train, to be enclosed by the power deck bed, thus to protect the drive train components against damage occurring from the components contacting tree limbs or other vegetation, or the like. Conversely, by enclosing the drive train components, the machine operator and others who might come in close proximity to the machine are protected against injury caused by contact with moving drive train components.

These and other advantages previously attributable to hydrostatic transmissions are effectively obtained from gear-operated transmissions by practice of the invention wherein the clutching function, that is required for the use of gear-operated transmissions, is effected by the engagement of idler wheels on the drive belts, which engagement occurs on belts that transmit drive torque from the engine to the input to the transmission instead of to the output of the transmission as has been the practice of the prior art. As a result, because the clutching function is imposed on drive belts subjected to high speed but low torque, as contrasted with the converse, which prevails with prior art belt driven machines of the concerned type, undue wear caused by belt slippage is avoided. Therefore, the frequency of belt replacement, with its attendant inoperability of the machine, is significantly reduced.

Undue stressing of drive belts utilized in the described machine is further reduced by the fact that the idler pulleys are caused to engage the associated belts on the inside surface of the belts, i.e., the same surface as is engaged by the driving and driven pulleys of the system. Thus, compressive stresses are continuously imposed upon the inside belt surface while the outside belt surface is continuously stressed in tension. These continuous stress conditions are contrasted with prior art devices wherein, due to the idler pulley engaging the concerned belts on the side opposite that engaged by the drive and driven pulleys, the belts undergo the alternate imposition of compression and tension stressing which results in increases in belt fatigue and rapid belt wear.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A self-propelled, walk-behind power tool comprising:
   a power deck mounting an engine having a rotatable drive shaft,
   a wheel drive assembly including left and right drive wheels mounted on opposite lateral spacing from beneath said power deck,
   a power train including a pair of gear-operated transmissions, each being drivingly connected to a respective one of said drive wheels, and means for drivingly connecting said transmissions to said engine drive shaft,
   a tool deck containing a rotatable drivable tool and being connected to a front side of said power deck,
   a handle bar attached to a rear side of said power deck and containing controls for independently operating each of said drive wheels and said rotatably mounted tool,
   said engine drive shaft containing a power take-off pulley and a pair of drive pulleys in axially spaced disposition along said drive shaft,
   input pulleys for rotating gears of said gear-operated transmissions being mounted on shafts extending from each of said gear operated transmissions on axes parallel to the rotation axis of said engine drive shaft,
   a power take-off belt operatively connecting said power take-off pulley to said tool,
   an input belt extending between each of said drive pulleys and a respective one of said input pulleys,
   said power train further including:
   a pair of idler pulleys, each being operative to engage a respective one of said input belts, each said idler pulley being rotatably mounted on one end of a lever which is pivotally mounted with respect to said power deck, and
   said controls on said handle bar including means connected to each respective idler pulley lever and being operative to pivot each said lever independently with respect to each other between angularly displaced positions to vary, incrementally the tension of the input belts on the respective drive and input pulleys for selectively varying the driving force to the respective drive wheels.

2. A self-propelled, walk-behind power tool according to claim 1 in which each said idler pulley lever is disposed within the periphery of the associated input belt.

3. A self-propelled, walk-behind power tool according to claim 2 including means for normally biasing each said idler pulley out of engagement with said associated input belt and each said idler pulley lever being operated by said controls to increase an engaging force between said idler pulley and its associated drive belt.

4. A self-propelled, walk-behind power tool according to claim 2 in which said controls include a pair of drive handles attached to said handle bars for independent pivotal movement and connecting rod means extending from each said drive handle to a respective one of said idler pulley levers.

5. A self-propelled, walk-behind power tool comprising:
   a power deck,
   an engine having a rotatable drive shaft and being mounted on said power deck,
   a wheel drive assembly including left and right drive wheels mounted on opposite spacing from beneath said power deck,
   a power train including a pair of gear operated transmissions each being drivingly connected to a respective one of said drive wheels,
   a tool deck containing a rotatably drivable tool and connected to a front side of said power deck,
   power take-off means drivingly interconnecting said drive shaft and said tool,
   a handle bar attached to a rear side of said power deck and containing controls for independently operating each of said drive wheels and said power take-off means,
   said controls including:
   a pair of independently operable handles pivotably connected to said handle bars,
   a pivot support shaft fixed to said power deck,
   a pair of independently movable drive levers pivotally mounted on said support shaft, each of said drive levers has means for incrementally controllably transferring a driving force from said engine drive shaft to a respective one of said transmissions in response to independent pivotal movement of said drive levers, and
   linkage means interconnecting each said handle to a respective one of said drive levers for selectively controlling the pivotal movement of each of said drive levers.

6. A self-propelled, walk-behind power tool according to claim 5 in which said engine drive shaft contains a pair of drive pulleys in axially spaced disposition along said drive shaft, input pulleys mounted on rotatable shafts extending from each of said transmissions on axes parallel to said engine drive shaft, input belts extending between each of said drive pulleys to a respective one of said input pulleys, a pair of idler pulleys, each being operative and engage a respective one of said input belts, each said idler pulley being rotatably mounted on one end of a respective idler pulley lever which is pivotally mounted with respect to said power deck, about an axis parallel to said drive shaft, and a connecting link connecting each said drive lever and a respective one of said idler pulley levers for independently selectively moving said idler pulleys with respect to said input belts.

7. A self-propelled, walk-behind power tool according to claim 6 in which each said connecting link provides a lost motion coupling between said drive lever and said idler pulley lever.

8. A self-propelled, walk-behind power tool according to claim 7 in which each said connecting link is a resilient spring having one end connected to said drive lever and its other end formed with an elongated loop for lost motion coupling to said associated idler pulley lever.

9. A self-propelled, walk-behind power tool according to claim 5 wherein said power take-off means includes:
   a power take-off pulley oil said engine drive shaft,
   a drive pulley associated with said tool and being rotatable about an axis parallel to said engine drive shaft,
   a power take-off belt extending between and drivingly connecting said power take-off pulley and said tool drive pulley,
   a power take-off idler lever mounted with respect to said power deck and carrying an idler pulley engageable with said power take-off belt,
   a power take-off handle pivotally connected to said handle bars,
   a power take-off lever pivotally mounted on said support shaft,
   a first power take-off link connecting said power take-off handle to said power take-off lever, and
   a second power take-off link connecting said power take-off lever with said power take-off idler lever.

10. A self-propelled, walk-behind power tool according to claim 5 including independent brake means operatively engageable with a respective one of said drive wheels, an operator for activating a respective one of said brake means, each said operator being connected to a respective one of said drive levers to activate each said brake means in response to pivotal movement of an associated drive lever.

11. A self-propelled, walk-behind power tool according to claim 10 in which said operator comprises a brake lever pivotally mounted adjacent each said drive wheel and said brake means comprises a brake band surrounding a hub of said drive wheel, the end of said brake band being connected to said brake lever to constrict about said wheel hub when said brake lever is pivoted in one direction and to expand about said wheel hub when said brake lever is pivoted in an opposite direction.

12. A self-propelled, walk-behind power tool according to claim 11 including a stiff link connecting each brake lever to one of said drive levers, respectively.

13. A self-propelled, walk-behind power tool according to claim 12 in which said stiff link contains a lost motion space operative to accommodate extended pivotal movement of said drive lever.

* * * * *